United States Patent
Xiong et al.

(10) Patent No.: US 12,164,496 B2
(45) Date of Patent: Dec. 10, 2024

(54) TRANSACTION EXECUTION METHOD, COMPUTING DEVICE, AND STORAGE MEDIUM

(71) Applicant: TENCENT TECHNOLOGY (SHENZHEN) COMPANY LIMITED, Shenzhen (CN)

(72) Inventors: Liangchun Xiong, Shenzhen (CN); Anqun Pan, Shenzhen (CN); Hailin Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/450,606

(22) Filed: Aug. 16, 2023

(65) Prior Publication Data

US 2023/0394027 A1    Dec. 7, 2023

Related U.S. Application Data

(63) Continuation of application No. PCT/CN2022/117451, filed on Sep. 7, 2022.

(30) Foreign Application Priority Data

Oct. 19, 2021    (CN) .......................... 202111214946.4

(51) Int. Cl.
*G06F 16/23*    (2019.01)
(52) U.S. Cl.
CPC ................................. *G06F 16/23* (2019.01)
(58) Field of Classification Search
None
See application file for complete search history.

(56) References Cited

U.S. PATENT DOCUMENTS

| | | | |
|---|---|---|---|
| 2005/0182782 A1* | 8/2005 | Anderson | G06F 16/24532 707/999.102 |
| 2010/0011026 A1 | 1/2010 | Saha et al. | |
| 2015/0156276 A1 | 6/2015 | Xue et al. | |
| 2018/0121494 A1* | 5/2018 | Antonopoulos | G06F 16/2365 |
| 2018/0285353 A1* | 10/2018 | Ramohalli Gopala Rao | G06F 16/214 |

(Continued)

FOREIGN PATENT DOCUMENTS

| | | |
|---|---|---|
| CN | 103092712 A | 5/2013 |
| CN | 103677752 A | 3/2014 |

(Continued)

OTHER PUBLICATIONS

The World Intellectual Property Organization (WIPO) International Search Report for PCT/CN2022/117451 Nov. 25, 2022 12 Pages (including translation).

*Primary Examiner* — Eddy Cheung
(74) *Attorney, Agent, or Firm* — Anova Law Group, PLLC

(57) ABSTRACT

A transaction execution method, performed by a computing device, includes: determining, in response to a data definition language (DDL) transaction in execution interruption satisfying a resumption condition, a last data block processed by the DDL transaction before the execution interruption; continuing, starting from a next data block following the last data block, executing the DDL transaction; and committing the DDL transaction after data blocks starting from the next data block operated by the DDL transaction are processed.

20 Claims, 12 Drawing Sheets

(56) References Cited

U.S. PATENT DOCUMENTS

2018/0322156 A1  11/2018  Lee et al.
2020/0118214 A1* 4/2020  Becker .................. G06F 16/23

FOREIGN PATENT DOCUMENTS

| CN | 106294477 A | 1/2017 |
| CN | 106682017 A | 5/2017 |
| CN | 112035410 A | 12/2020 |

* cited by examiner

TRANSACTION EXECUTION METHOD, COMPUTING DEVICE, AND STORAGE MEDIUM

CROSS-REFERENCES TO RELATED APPLICATIONS

This application is a continuation application of PCT Patent Application No. PCT/CN2022/117451, filed on Sep. 7, 2022, which claims priority to Chinese Patent Application No. 202111214946.4, filed on Oct. 19, 2021, the content of all of which is incorporated herein by reference in their entirety.

FIELD OF THE TECHNOLOGY

The present disclosure relates to the technical field of databases, and in particular, to a transaction execution method and apparatus, a computing device, and a storage medium.

BACKGROUND OF THE DISCLOSURE

With the development of a database technology, a structured query language (SQL) is a database query and programming language used for accessing data, and querying, updating and managing relational database systems. A class of data definition language (DDL) statements is involved in an SQL command. The DDL statements are statements for modifying definitions of objects (for example, tables, indexes, columns, triggers, and the like) in a database. When the DDL statements are executed on an object in the database, it is often required to lock the object, thereby blocking modification of data in the object by other service transactions during the execution of the DDL statements, so as to ensure consistency of the data stored in the object operated by the DDL statements.

SUMMARY

One aspect of the present disclosure provides a transaction execution method, performed by a computing device. The method includes determining, in response to a data definition language (DDL) transaction in execution interruption satisfying a resumption condition, a last data block processed by the DDL transaction before the execution interruption; continuing, starting from a next data block following the last data block, executing the DDL transaction; and committing the DDL transaction after data blocks starting from the next data block operated by the DDL transaction are processed.

Another aspect of the present disclosure provides a computing device. The computing device includes one or more processors and one or more memories, the one or more memories storing at least one computer program, the at least one computer program being loaded and executed by the one or more processors to implement a transaction execution method. The method includes determining, in response to a data definition language (DDL) transaction in execution interruption satisfying a resumption condition, a last data block processed by the DDL transaction before the execution interruption; continuing, starting from a next data block following the last data block, executing the DDL transaction; and committing the DDL transaction after data blocks starting from the next data block operated by the DDL transaction are processed.

Another aspect of the present disclosure provides a non-transitory computer readable storage medium, storing at least one computer program, the at least one computer program being loaded and executed by a processor to implement a transaction execution method. The method includes determining, in response to a data definition language (DDL) transaction in execution interruption satisfying a resumption condition, a last data block processed by the DDL transaction before the execution interruption; continuing, starting from a next data block following the last data block, executing the DDL transaction; and committing the DDL transaction after data blocks starting from the next data block operated by the DDL transaction are processed.

DESCRIPTION OF EMBODIMENTS

Figure 1:
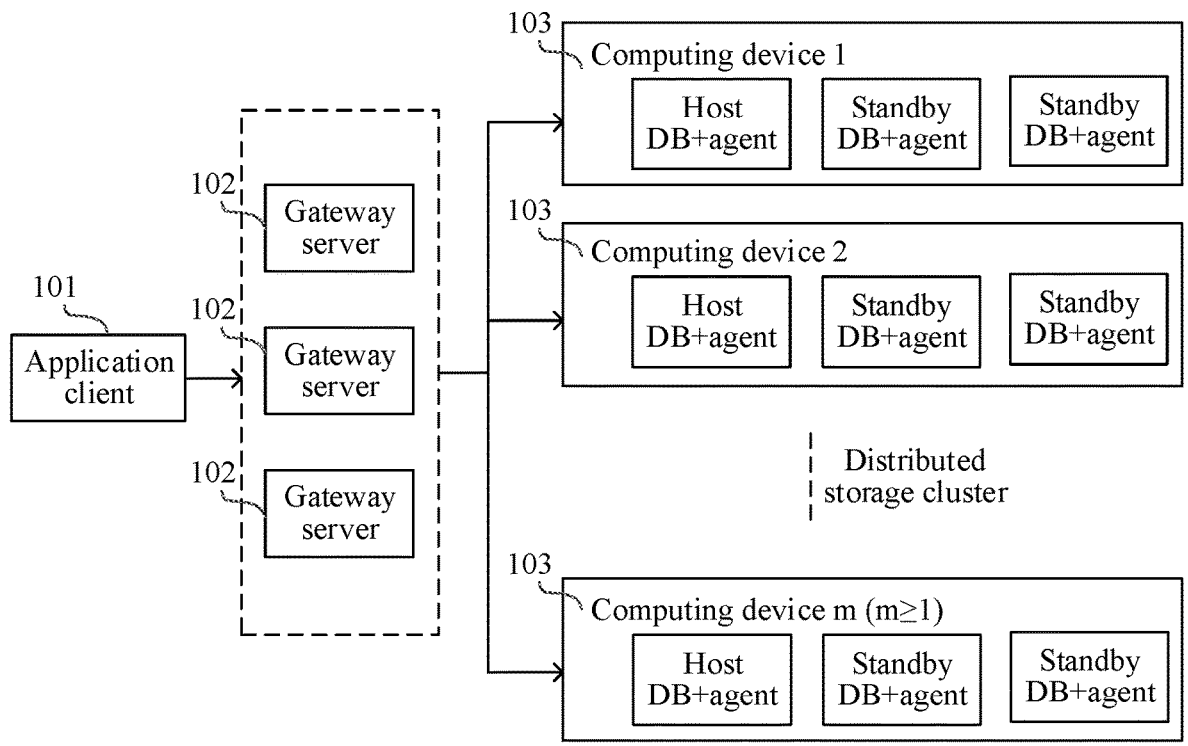
FIG. 1 is a schematic diagram of an implementation environment of a transaction execution method according to an embodiment of the present disclosure.

To make the objects, technical solutions, and advantages of the present disclosure clearer, the following further describes implementations of the present disclosure in detail with reference to the accompanying drawings.

The terms "first", "second", and the like in the present disclosure are used for distinguishing the same or similar items that perform substantially the same function. It is to be understood that the terms "first", "second", and "nth" do not have a logical or chronological dependency on each other or limit the number and order of execution.

The term "at least one" in the present disclosure means one or more, and the meaning of "multiple" means two or more. For example, multiple first positions mean two or more first positions.

Before introducing embodiments of the present disclosure, it is necessary to introduce some basic concepts in the field of cloud technology.

Cloud Technology: The cloud technology is a hosting technology that unifies a series of resources, such as hardware, software, and network, in a wide area network or a local area network, so as to realize computing, storage, processing, and sharing of data, namely, a general term of a network technology, an information technology, an integration technology, a management platform technology, and an application technology based on cloud computing business/service model application. The technology is used as needed and flexibly and conveniently by composing a resource pool. A cloud computing technology will be an important support in the field of cloud technology. A background service of a technical network system requires a large amount of computing and storage resources, such as video websites, image websites, or more portal websites. As the Internet industry is highly developed and applied, each article may have a corresponding identification mark in the future and needs to be transmitted to a background system for logical processing. Data at different levels is separately processed, and data in various industries requires strong system support, which can only be implemented through cloud computing.

Cloud Storage: Cloud storage is a new concept extended and developed in the concept of cloud computing. A distributed cloud storage system (hereinafter referred to as a storage system) refers to a storage system which integrates a large number of different types of storage devices (storage devices are also referred to as storage nodes) in a network through the functions of cluster application, grid technology and distributed storage file systems to work together through application software or application interfaces to provide data storage and service access functions together.

Database: The database may be regarded, in short, as an electronic filing cabinet-a place where electronic files are stored, so as to support users to add, query, update, and delete data in the files. The so-called "database" is a set of data that is stored together in a manner, may be shared with multiple users, has as little redundancy as possible, and is independent of applications.

The following explains terms involved in the embodiments of the present disclosure.

DDL Statement: The DDL statement is a DDL statement operation, referring to a statement for modifying a definition of an object (for example, a table, an index, a column, a trigger, or the like) in a database.

Online DDL: The online DDL is relative to an offline DDL. When a DDL statement is executed on an object in the database, the object is locked, and then a change operation is executed. The foregoing locking can block modification of data in the object by other service transactions (such as DML transactions) during the execution of the DDL statement, so as to ensure consistency of the data stored in the object operated by the DDL statement. DML refers to a data manipulate language. In other words, during the execution of the DDL statement, a service operation (service transaction) initiated by a user may be blocked because the object is locked. As users have increasing requirements for high availability of services, various database vendors propose online DDL implementations that do not block or block user services for only a small period of time when making DDL changes to an object.

Thomas Write: In the field of computer science, particularly in the field of databases, Thomas write is a timestamp-based concurrency control mechanism that is summarized as ignoring out-of-date writes. For example, transaction 1 starts to modify data A at time T1, and transaction 2 also modifies data A at time T2. T1<T2. For some reason, transaction 1 and transaction 2 simultaneously submit a commission application to a database. Under an optimistic transaction commission mechanism, the database will commit a transaction which has first reached the commission application, and other conflicting transactions roll back. However, under a Thomas write rule, the database needs to ensure that the commission of transaction 2 will certainly succeed, because a timestamp of transaction 1 is considered to be an out-of-date write under the Thomas write rule, and needs to be rolled back when there is a conflict. Other transactions will wait under a pessimistic transaction model because some data to be modified has been locked. Therefore, two transactions will not modify the same data at the same time and will not commit the same data at the same time.

Tuple (Data Record): Tuple generally refers to a row of data records in a data table in a relational database. The data record stores instantiation information of all columns in a table definition and is arranged in the order of column definitions to constitute a continuous content. That is to say, the continuous content is referred to as a data record of the data table, namely, Tuple.

Data Dictionary: The data dictionary stores definitions of objects in the database. The objects in the database include: database, table space, data table, data column, data index, partition information, user, function, role, and the like.

Parallel Degree: How many parallel processing tasks will be started in parallel processing to decompose original tasks required to be processed. Generally, in computer processing, full data originally required to be processed is divided into several subtasks. A specified number of threads of parallel degree are started. Subtasks are obtained and processed according to corresponding processing logic. Ideally, parallel execution can achieve the multiple performance improvement of the parallel degree.

The following describes an offline execution mode of the DDL statement in a conventional database.

For a conventional stand-alone database system, the execution of conflicting operations is blocked by locking metadata, thereby ensuring the correct execution of Schema (set of database objects) change, namely, ensuring the correct execution of the DDL statement.

For a conventional cluster database system, as an extension of the stand-alone database system, the cluster database system includes multiple computing nodes (namely, computing devices). Multiple data tables are stored in a database of each computing node. One or more data records (namely, data rows) are stored in each data table. Each data record is composed of a group of field sets arranged according to the same position index, namely, a data field column. The database of the computing node is any type of cluster database, including at least one of a relational database or a non-relational database, for example, an SQL database, MySQL, NoSQL, NewSQL (generally referring to various new extensible/high-performance databases), and the like. The type of the database is not specifically limited in this embodiment of the present disclosure.

For the foregoing cluster database system, an execution mode of the DDL statement is divided into a share memory mode and a share nothing mode:

A) According to the share memory mode, an access control logic of each computing node for a certain Schema object is controlled by a central coordination node in a cluster.

B) According to the share nothing mode, generally, all the computing nodes have a control node to determine which computing nodes need to participate in the execution of the DDL statement. Then the DDL statement is distributed to the corresponding computing nodes for execution which is considered as execution on the stand-alone database system in each computing node. Therefore, it is basically the same as a stand-alone database.

For a cloud native database architecture with separated computing and storage, only single-write is implemented at present, which is consistent with a single instance of MySQL. In the implementation of a multi-write cluster scheme, it is necessary to synchronize DDL lock in multiple write nodes to ensure the data consistency before and after the change of DDL as well as during the change.

In summary, regardless of the conventional stand-alone database, the conventional cluster distributed database or the database architecture with separated computing and storage, if an execution thread of a DDL statement crashes due to a certain fault during the execution of the DDL statement, after an exceptional interruption of the DDL statement, an ability to continue execution at an interruption cannot be provided, because either the DDL statement will be rolled back, or the DDL statement is redone from the beginning after rolling back to the state at the beginning of the DDL statement through a redo log. When a data volume stored by an object operated by the DDL statement is large (for example, a table storing mass data), the cost of redoing the DDL statement by a database system is high. In other words, the success rate of a DDL transaction is low, and the resource utilization rate of a database is low.

In view of this, an embodiment of the present disclosure provides a transaction execution method, which is applied to various types of database systems, such as a conventional database and a distributed database. A scheme for resuming execution at an abnormal interruption point for a DDL transaction is provided. After the execution of the DDL transaction is abnormally interrupted, a background thread or process can continue to complete the implementation of DDL at the position of the last interruption, whereby the success rate of the DDL transaction operating a relatively large object (for example, a table storing mass data) can be improved, and since some processing results which have been completed before the interruption can be retained, the overall resource utilization of databases is improved.

In some embodiments, this embodiment of the present disclosure is also applied to a database system based on a blockchain technology (hereinafter referred to as a "blockchain system"). The blockchain system is a decentralized distributed database system in nature. A consensus algorithm can keep ledger data recorded by different computing devices on a blockchain consistent. The encrypted transmission and non-tampering of the ledger data between different computing devices can be ensured by a cryptographic algorithm. A ledger function is expanded by a script system. The interconnection between different computing devices is performed by network routing.

One or more blockchains are included in the blockchain system. The blockchain is a series of data blocks generated in association using a cryptographic method. Each data block contains information of a batch of network transactions for verifying the validity (anti-counterfeiting) of the information and generating a next block.

A peer to peer (P2P) network is formed between computing devices in the blockchain system. A P2P protocol is an application layer protocol running on a transmission control protocol (TCP). In the blockchain system, the computing device has the following functions: 1) routing: a basic function of the computing device for supporting communication between computing devices; 2) application: deployed in a blockchain for implementing a specific service according to actual service requirements, recording data related to the implementation of the function to form ledger data, carrying a digital signature in the ledger data to represent a data source, and transmitting the ledger data to other computing devices in the blockchain system, whereby the other computing devices add the ledger data to a temporary block when the source and integrity of the ledger data are verified successfully, where the service implemented by the application includes a wallet, a shared ledger, a smart contract, and the like; and 3) a blockchain, including a series of blocks successively in a chronological order, where a new block is no longer removed once added to the blockchain, and ledger data committed by the computing device in the blockchain system is recorded in the blocks.

In some embodiments, each block includes a hash value of a transaction record stored in the block (a hash value of the block) and a hash value of a previous block. The various blocks are connected via the hash values to form a blockchain. In addition, the block further includes information such as a timestamp when the block is generated.

The following describes the system architecture of the embodiments of the present disclosure.

FIG. 1 is a schematic diagram of an implementation environment of a transaction execution method according to an embodiment of the present disclosure. Referring to FIG. 1, the exemplary implementation environment is applied to various database systems, such as a stand-alone database, a cluster database, and a cloud native database architecture with separated computing and storage. The following describes an example where this embodiment of the present disclosure is applied to a distributed cluster database. The distributed cluster database system includes an application client 101, a gateway server 102, and a distributed storage cluster 103. The distributed storage cluster 103 includes one or more computing devices (namely, computing nodes).

The application client 101 refers to a client installed and run on a terminal at a user side and capable of initiating a data request. The data request is a DDL request or a DML request, etc. This is not specifically limited in this embodiment of the present disclosure. In some embodiments, types of the application client 101 include: a payment application, a social application, an audio/video application, a livestreaming application, a shopping application, a take-out application, or a car-hailing application. The type of the application client 101 is not specifically limited in this embodiment of the present disclosure. In some embodiments, a terminal on a user side is also referred to as a user equipment, a terminal device, a user terminal, a mobile terminal, a smart terminal, a communication device, or the like. Device types of the terminal include: a smartphone, a tablet personal computer, a laptop computer, a desktop computer, a smart speaker, a smartwatch, a vehicle-mounted terminal, a smart home appliance, a smart voice interaction device, and the like, but are not limited thereto.

The application client 101 and the gateway server 102 are directly or indirectly connected through wired or wireless communication. The present disclosure is not limited thereto herein.

The gateway server 102 is configured to receive an external data request, and distribute a read-write transaction corresponding to the data request to the distributed storage cluster 103. Schematically, a user logs in the application client 101 on a terminal, and triggers the application client 101 to generate a DDL request. For example, the DDL request is to modify a table name of a data table A. The application client 101 invokes an application programming interface (API) provided by a distributed cluster database system, and transmits the DDL request to the gateway server 102. For example, the API is a MySQL API (an API provided by a relational database system). For another example, in a smart traffic scenario, a request for description information of an added parking space is a DDL request, and a request for querying an existing parking space is a DML request.

In some embodiments, the gateway server 102 is merged with any computing device in the distributed storage cluster 103 on the same physical machine. That is to say, a computing device serves as the gateway server 102.

The distributed storage cluster 103 includes one or more computing devices. The number of computing devices in the distributed storage cluster 103 is not specifically limited in this embodiment of the present disclosure. For example, the number of computing devices is m, and m is an integer greater than or equal to 1. In some embodiments, each computing device adopts a host/standby structure (one-host/many-standby cluster). As shown in FIG. 1, a computing device is a one-host/two-standby cluster schematically. Each computing device includes a host and two standbys. In some embodiments, each host or standby is configured with an agent device. The agent device is physically independent from the host or standby, or the agent device serves as an agent module on the host or standby. Computing device 1 is taken as an example. Computing device 1 includes a host database and agent device (host database+agent, referred to as host DB+agent), and further includes two standby database and agent devices (standby database+agent, referred to as standby DB+agent).

In an exemplary scenario, a host or standby database instance set of each computing device is referred to as a SET. For example, assuming a computing device is a stand-alone device, the SET of the computing device is only a database instance of the stand-alone device, and assuming a computing device is a one-host/two-standby cluster, the SET of the computing device is a set of a host database instance and two standby database instances.

In some embodiments, the distributed cluster database system composed of the gateway server 102 and the distributed storage cluster 103 is considered to be a server for providing a data service to a user terminal. The server is an independent physical server, a server cluster or a distributed system composed of multiple physical servers, or a cloud server providing basic cloud computing services, such as a cloud service, a cloud database, cloud computing, a cloud function, cloud storage, a network service, cloud communication, a middleware service, a domain name service, a security service, a content delivery network (CDN), and big data and artificial intelligence platforms.

The following describes a data structure involved in this embodiment of the present disclosure.

In order to enable a DDL transaction to resume execution from an interruption, it is necessary to divide data in a modified data table of the DDL transaction into multiple small logical or physical units and to use the minimum units as breakpoint positions in a data line in the data table. Generally, an object of a database organizes data in the object in an underlying file system or storage manner, and mapping the data in the object to the file system or storage system generally involves the following cases:

a) Heap Table Data Management Mode

In the heap table data management mode, the database manages data records in the data table in a heap table manner. That is, the data records in the data table are organized and stored in a certain size of pages or blocks. In other words, the data records are all stored in data blocks of a fixed size, and generally referred to as pages or blocks. For example, the data blocks are pages with a size of $2''k$, while actual data is also stored in the pages with a size of $2''k$.

b) B+ Tree Data Management Mode

A block of a fixed size is selected to represent non-leaf nodes and leaf nodes of a B+ tree. The actual data will be stored in the leaf nodes. This mode is the same data storage mode as the heap table data management mode in a).

c) Log-Structured Merge Tree (LSM) Data Management Mode

The LSM data management mode is a key-value data management mode. In order to improve read-write efficiency, a certain number of key-value pairs are generally organized in block mode. In some databases, in order to achieve horizontal expansion of storage, a definition of a region (domain) is introduced. The region is a logical mapping of one or more physical blocks. By adding the logical mapping, a real storage position of data associated with the region can be masked. In other words, data with a certain size in the LSM storage mode will constitute the concept of a block or region, and the region or block has a certain data range. Therefore, the LSM data management mode is also considered to store data in a block manner.

Through the above analysis, for the implementation of table data storage in various databases, a block can be found at the granularity of storing data as a minimum unit during the data processing of the DDL transaction in this embodiment of the present disclosure.

On the basis of the block being the minimum unit during the data processing of the DDL transaction, this embodiment of the present disclosure will describe an abnormal interruption resumption execution flow of a transaction execution method. This embodiment of the present disclosure is applied to a stand-alone database system, a cluster database system, a distributed database system, a cloud native database architecture with separated computing and storage, a blockchain system, and the like, and is not specifically limited herein.

Figure 2:
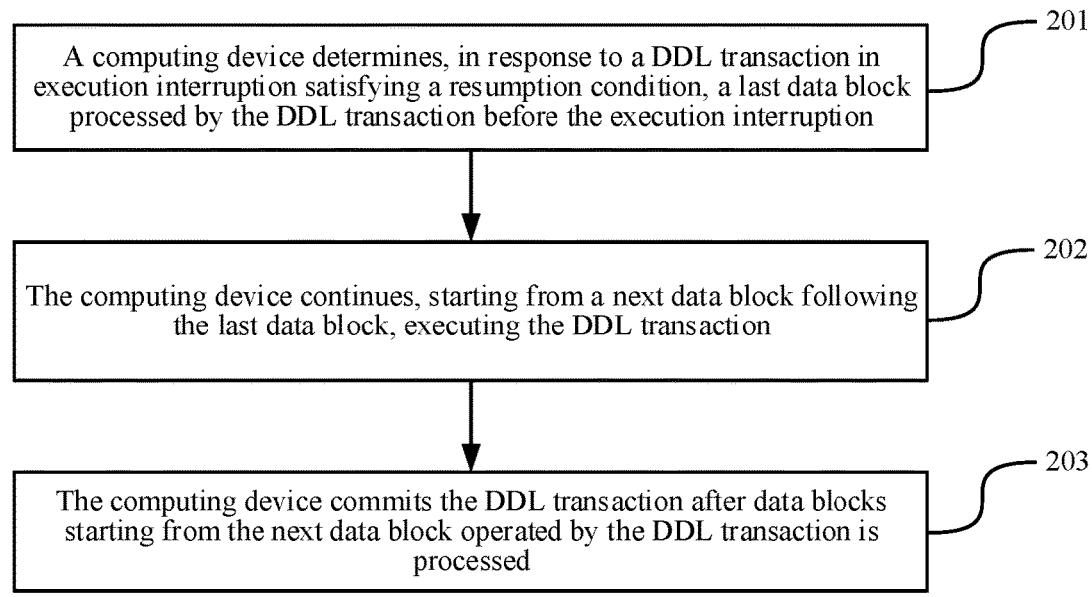
FIG. 2 is a flowchart of a transaction execution method according to an embodiment of the present disclosure.

FIG. 2 is a flowchart of a transaction execution method according to an embodiment of the present disclosure, which may be performed by any computing device in a database system. Exemplary steps may include the following.

201: the computing device determines, in response to a DDL transaction in execution interruption satisfying a resumption condition, a last data block processed by the DDL transaction before the execution interruption.

In some embodiments, a user logs in an application client on a terminal and triggers the application client to generate a DDL request. For example, the DDL request is to add an index to a data table A, or the DDL request is to modify a table name of the data table A. The type of the DDL request is not specifically limited in this embodiment of the present disclosure. After generating the DDL request, the application client invokes an API to transmit the DDL request to the computing device.

In some embodiments, the computing device receives any data request from the application client, parses a header field of the data request, creates, when the header field indicates that the data request is a DDL request, a new DDL process or thread for the DDL request, or multiplexes a certain DDL process or thread that has been created, and executes a DDL transaction associated with the DDL request via the DDL process or thread.

In some embodiments, the computing devices execute the DDL transaction serially, or one or more computing devices within the database system execute the DDL transaction in parallel. For example, multiple DDL threads on a single computing device execute the DDL transaction in parallel, or multiple respective DDL threads on multiple computing devices execute the DDL transaction in parallel. This embodiment of the present disclosure is not specifically limited.

In some embodiments, during the execution of a DDL transaction, the execution of the DDL transaction is interrupted for some reason (for example, a process or thread crashes, flashes, or the like). After the database system is restarted, if a background DDL execution detector detects a certain DDL transaction in execution interruption, when the DDL transaction satisfies a resumption condition, since data blocks are taken as minimum units for transaction processing, a last data block processed by the DDL transaction before the execution interruption is determined, and the following step 202 is performed. The DDL execution detector is configured to periodically detect whether an abnormal execution of the DDL transaction currently occurs in the database.

In some embodiments, each DDL transaction is divided into two stages for execution. In the first stage, a definition of an object operated by the DDL transaction is modified in a data dictionary of a data table operated by the DDL transaction. For example, if the DDL transaction is to add an index, the data dictionary of the data table needs to be modified in the first stage to add a definition of the index, so as to complete the addition of an index structure into a table object, and the index is set to a delete only state. At this moment, the definition of the index is added into the structure of the table, but the index cannot be selected by an optimizer, and the added index cannot be used in querying data in the query. In the second stage, full table data operated by the DDL transaction needs to be scanned so as to process each data record involved in the object operated by the DDL transaction. For example, if the DDL transaction is to add an index, it is necessary to synchronously or asynchronously perform the task of filling index data, for example, scanning the full table data, and creating a key value of the index for each data record (Tuple) in the second stage. At this moment, the index needs to be set to a write only state. A transaction of modifying the table data starts before the write only state. If the transaction is not committed, after the write only state is set successfully, a database engine will deny commission of the transaction during the commission, whereby the transaction is rolled back.

In some embodiments, when the index is set to the write only state in the second stage, a transaction identification (ID) is also obtained or applied, and a transaction (namely, a DDL transaction associated with a DDL request) which starts earliest after the write only state is set is indicated by the transaction ID. Therefore, the first stage is considered to be an initialization stage of the DDL transaction, and the second stage is considered to be an execution stage of the DDL transaction. The transaction ID increases monotonically with the timestamp. In some embodiments, the transaction ID is allocated in a stand-alone database based on a preset rule, and a device (such as a coordination node) for generating a global transaction ID is applied for the transaction ID in a cluster database. The manner for obtaining the transaction ID is not specifically limited in this embodiment of the present disclosure.

In some embodiments, in the second stage, the full table data starts to be scanned based on the DDL transaction. For example, if the DDL transaction is to add an index, an index key value of each data record is filled using a Thomas write rule. In addition, after the index is set to the write only state, all modification transactions to the data table also need to update the corresponding index at the same time, but since the index in the write only state has not completed data filling, the added index in the second stage cannot be used by the optimizer to query data. According to the Thomas write rule, for a user operation (such as a DML transaction) which starts and modifies an index after a DDL transaction scanning a full table and filling an index, since the timestamp of the DML transaction is newer than the timestamp of the DDL transaction performing scanning, when the DDL transaction fills an index key value, if it is found that there is a conflict (namely, the index already contains a certain key value, indicating that there has been a user modifying a key value field and completing the synchronization of the index key value), the DDL filling transaction directly discards the current key value and continues subsequent record scanning.

This embodiment of the present disclosure is applied to an online DDL scenario and also to an offline DDL scenario. The resumption conditions of a DDL transaction are different in different scenarios, which are described below.

In the online DDL scenario, if the DDL transaction is an online DDL transaction, there are two cases where the execution interruption of the DDL transaction cannot be resumed. That is, when the following cases (I) or (II) are satisfied, the resumption condition is not satisfied, and the database engine rolls back the DDL transaction:

In case (I), the DDL transaction has not completed the first stage. Since the first stage refers to modifying the definition of the object operated by the DDL transaction in the data dictionary of the data table operated by the DDL transaction, the case where the first stage has not been completed represents that: the data dictionary of the data table operated by the DDL transaction does not include the definition of the object operated by the DDL transaction.

For example, the DDL transaction adds an index. In the first stage, the data dictionary of the data table needs to be modified to add a definition of the index, and the index is set to a delete only state. If the DDL transaction has not completed the first stage, there is no definition about the index in the data dictionary of the data table. For example, no information of the index can be queried in the data dictionary of the data table, the DDL transaction cannot continue to be executed from an abnormal interruption point, and the DDL transaction will be rolled back.

In case (II), the DDL transaction has a hardware issue that makes a next block following a last block and all copies of the next block unavailable.

In other words, after the last block is processed by the DDL transaction, the next block and all copies of the next block cannot be read due to a hardware fault. The exceptional interruption caused by this reason cannot be resumed even after the system is restarted. When the consistency of block data is guaranteed, multiple copies (one-host/two-standby, one-host/many-standby, or the like) are generally stored by each block in the database to ensure that data will not be lost even if a hardware disk fault occurs. Therefore, case (II) will only occur in the extreme case where all copies on all machines are not available, but the probability of such an extreme case is very low, almost 0.

The foregoing (I) and (II) introduce two cases where the resumption condition is not satisfied in the online DDL scenario, and then remaining cases not belonging to the foregoing (I) and (II) all satisfy the resumption condition. That is to say, the resumption condition in the online DDL scenario includes: the data dictionary of the data table operated by the DDL transaction includes the definition of the object operated by the DDL transaction, and a data block operated by the DDL transaction or at least one copy of the data block is readable.

In the offline DDL scenario, if the DDL transaction is an offline DDL transaction, the execution flow of the offline DDL transaction is relatively simple, generally, a temporary data table is created after the execution of the DDL transaction. Data records in an original data table are copied into the temporary data table. After objects in the temporary data table are correspondingly processed, a table name of the original data table is modified, a table name of the temporary data table is modified to the table name of the original data table, and then the original data table is deleted asynchronously. Therefore, the resumption condition in the offline DDL scenario includes: both the original data table operated by the DDL transaction and the temporary data table created by the DDL transaction exist. At this moment, it indicates that the data records in the original data table have not been scanned and scanning needs to be resumed from the execution interruption point.

If the resumption condition is not satisfied in the offline DDL scenario, it indicates that at least one of the original data table or the temporary data table does not exist, and at this moment, it is determined whether to roll back the DDL transaction or continue to advance the DDL transaction as appropriate. If the original data table exists, but the temporary data table has not been created, the DDL transaction will be rolled back when this case is satisfied. Otherwise, it can be divided into the following three cases (a) to (c) for discussion. When any one of the following cases (a) to (c) is satisfied, the full table has been scanned before the execution interruption, and only the DDL transaction needs to be further advanced without rolling back the DDL transaction:
  (a) The original data table is renamed successfully, and the temporary data table exists. It indicates that the original data table has been scanned, and the DDL transaction continues to be advanced. In other words, the table name of the temporary data table continues to be modified to the table name of the original data table, and then the original data table is deleted asynchronously.
  (b) The temporary data table is renamed to the original data table, and another temporary data table formed after the original data table is renamed also exists. It indicates that the original data table has been scanned, and the DDL transaction continues to be advanced. In other words, the another temporary data table continues to be deleted from the data dictionary, and data in the another temporary data table is deleted asynchronously.
  (c) The temporary data table is renamed to the original data table, and another temporary data table formed after the original data table is renamed does not exist, so as to continue to advance the DDL transaction. In other words, it is confirmed that data in the another temporary data table is deleted asynchronously.

In the foregoing process, the process of determining whether a DDL transaction satisfies a resumption condition in an online DDL scenario and an offline DDL scenario is introduced respectively. When it is confirmed that the DDL transaction in execution interruption satisfies the resumption condition in the corresponding scenario, the computing device determines a last block processed by the DDL transaction before the execution interruption. As described before in this embodiment of the present disclosure, regardless of the heap table data management mode, the B+ tree data management mode, or the LSM data management mode, blocks may be taken as minimum units for processing DDL transactions. Therefore, single management data is added for each DDL transaction, the management data records each block processed by the DDL transaction, and each time the DDL transaction correspondingly processes each data record in one block, the processed block is recorded in the management data. In some embodiments, in order to save storage space, only a block ID of each block is recorded in management data. The management data is also referred to as a block management structure.

In some embodiments, the computing device obtains management data of the DDL transaction, and queries, from the management data, a last block processed by the DDL transaction before the execution interruption. Since blocks are taken as minimum units for processing DDL transactions and the management data is maintained for each DDL transaction, each processed block will be recorded in the management data, whereby an abnormal interruption point can be conveniently located from the management data after the execution interruption of the DDL transaction, and the DDL transaction starts to be continuously executed from the abnormal interruption point without redo or rollback from the beginning, thereby greatly improving the success rate of the DDL transaction.

202: The computing device continues, starting from a next data block following the last data block, executing the DDL transaction.

In some embodiments, since each block is stored in the data table in sequence, after locating a last block processed before the execution interruption, all the blocks preceding the last block are processed, without re-processing. It is only necessary to locate a next block following the last block from the data table and continue executing the DDL transaction from the next block. For example, the DDL transaction is to add an index, and is abnormally interrupted at the time of scanning block 10 in the data table in the second stage. At this moment, block 10 has not been processed. Therefore, the management data records the processed blocks 1-9 instead of block 10, and it is determined that the last processed block before the abnormal interruption is block 9. Therefore, the computing device, starting from block 10 following block 9, continues executing the DDL transaction, thereby avoid rolling back the DDL transaction as a whole. Moreover, it is unnecessary to start from block 1 to redo, and the redundant workload of at most one block will be generated (that is, an interruption occurs when processing the last data record of block 10, thereby adding the redundant workload of half of a block on average), thereby greatly improving the resource utilization rate of the database.

203: The computing device commits the DDL transaction in response to each data block operated by the DDL transaction being processed.

In some embodiments, the computing device processes the DDL transaction in blocks. That is, one block is read at a time. Then each data record in the read block is processed depending on the type of the DDL transaction. For example, the DDL transaction is to add an index, and then a key value of the index needs to be filled for each data record. After all the data records of this block have been processed, a next block is read, the same processing is performed on each data record in the next block, and so on. The foregoing operation is iteratively executed until there is no block needing to be processed, namely, all the blocks have been processed. At this moment, the DDL transaction is committed. For example, the DDL transaction is to add an index. When the DDL transaction is committed, the index is set to a public state, the DDL transaction enters a commit stage, and the end of the DDL task is marked.

All the foregoing example technical solutions may be combined in different manners to form other embodiments of the present disclosure, and will not be described in detail herein.

In the technical solution provided by this embodiment of the present disclosure, data blocks are taken as minimum units for processing a DDL transaction. In the execution interruption of the DDL transaction, a last data block processed before the interruption can be conveniently located. It is not required to roll back the DDL transaction as a whole, but to continue, starting from a next data block, executing the DDL transaction, thereby avoiding the redundant workload caused by redoing the DDL transaction, improving the success rate of the DDL transaction indicated by a DDL statement, and improving the resource utilization rate of a database.

The foregoing embodiment briefly describes how to locate an abnormal interruption point and continue executing a DDL transaction after the execution interruption of the DDL transaction. This embodiment of the present disclosure supports both serial processing on the DDL transaction and parallel processing on the DDL transaction. Therefore, in this embodiment of the present disclosure, the serial processing flow of the DDL transaction will be described in detail, and the parallel processing flow of the DDL transaction will be described in detail in a next embodiment.

Figure 3:
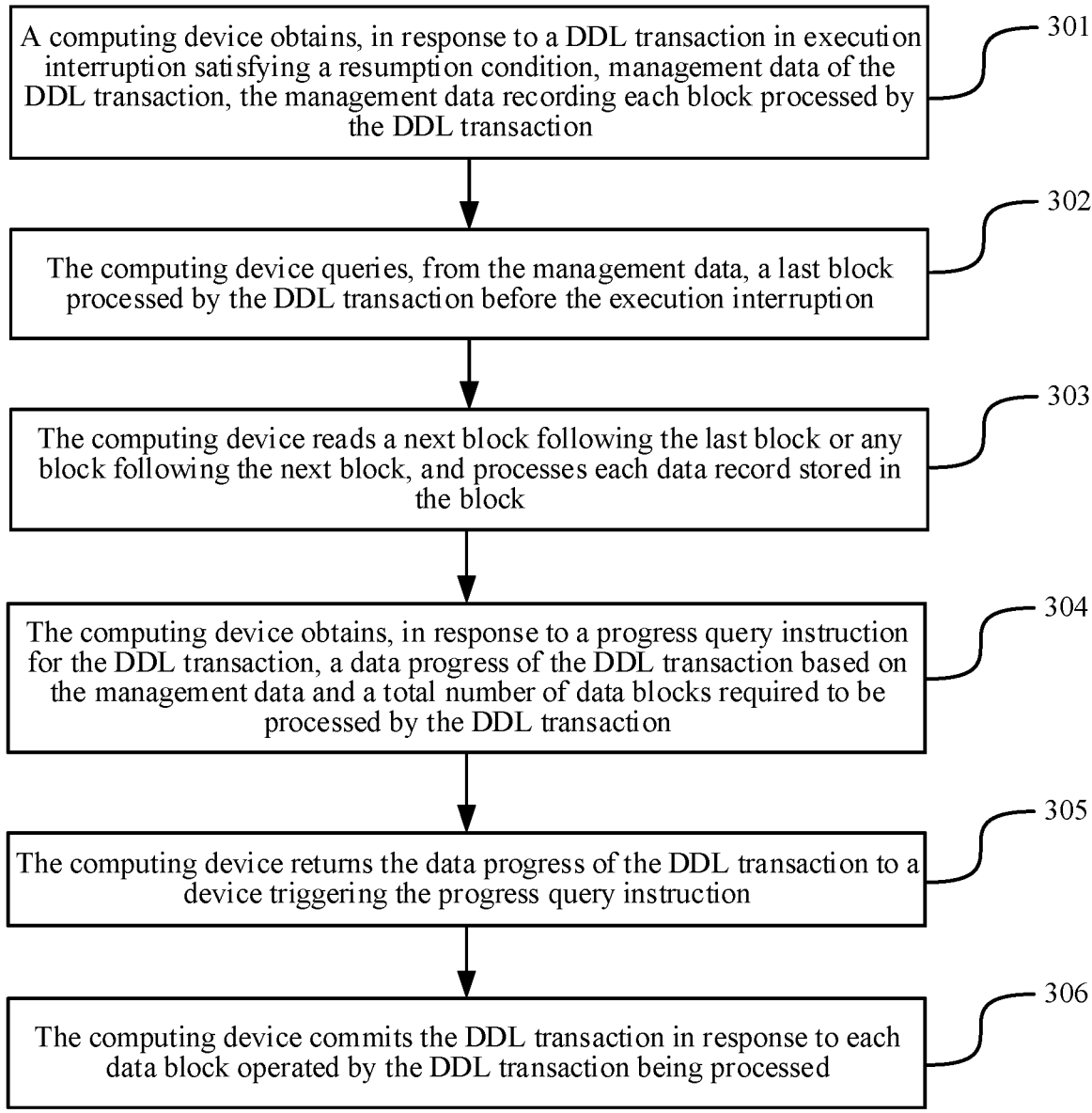
FIG. 3 is a flowchart of a transaction execution method according to an embodiment of the present disclosure.

FIG. 3 is a flowchart of a transaction execution method according to an embodiment of the present disclosure, which may be performed by any computing device in a database system. The database system includes: a stand-alone database system, a cluster database system, a distributed database system, a cloud native database architecture with separated computing and storage, a blockchain system, and the like. This embodiment includes the following exemplary steps.

301: the computing device obtains, in response to a DDL transaction in execution interruption satisfying a resumption condition, management data of the DDL transaction, the management data recording each block processed by the DDL transaction.

The process of determining whether the DDL transaction satisfies the resumption condition in the online DDL scenario and the offline DDL scenario has been described in the previous embodiment, and will not be described in detail herein.

In response to the DDL transaction in the execution interruption satisfying the resumption condition, the computing device obtains management data of the DDL transaction. Since the management data records each block processed by the DDL transaction, when the DDL transaction finishes processing each data record stored in each block, a block ID of the processed block is recorded in the management data.

In some embodiments, the block ID of each block is recorded only in the management data. The management data is also referred to as a block management structure, whereby a storage data volume occupied by the management data can be saved. Schematically, the management data is a dynamic array. The dynamic array stores the block ID of each block processed by the DDL transaction, and a last element in the dynamic array stores the block ID of the last processed block.

The dynamic array is merely an exemplary illustration of the management data, and the management data is also provided as other data structures such as a hash table, a set, a queue, and a stack. This embodiment of the present disclosure is not specifically limited thereto.

In some embodiments, when entering the second stage of the DDL transaction, the computing device obtains a transaction ID of the DDL transaction, creates management data for the DDL transaction, and thereafter maintains the management data in real time as the DDL transaction processes the data table. That is to say, as the DDL transaction scans the full table data, one block in each pair of data tables is scanned, and the latest scanned block is recorded in the management data. For example, the block ID of the latest scanned block is stored in the last element of the dynamic array. At a certain moment, the execution of a DDL transaction is interrupted. The DDL execution detector finds that the DDL transaction satisfies a resumption condition, and obtains management data of the DDL transaction from a cache region. For example, a dynamic array of the DDL transaction is obtained from the cache region.

302: the computing device queries, from the management data, a last block processed by the DDL transaction before the execution interruption.

In some embodiments, various blocks in the data table are generally processed in ascending order of blocks. Therefore, at the time of query, the computing device reads, from the management data, a block ID of each block processed by the DDL transaction before the execution interruption, and determines a block with the largest block ID as the last processed block before the execution interruption.

In some embodiments, when the management data is a dynamic array, a last element in the dynamic array stores the block ID of the last processed block. Therefore, at the time of query, the computing device determines a block indicated by a block ID stored in the last element in the dynamic array as the last processed block before the execution interruption.

In step 301 and step 302, an exemplary implementation is provided for determining the last block processed by the DDL transaction before the execution interruption. Since blocks are taken as minimum units for processing DDL transactions and the management data is maintained for each DDL transaction, each processed block will be recorded in the management data, whereby an abnormal interruption point can be conveniently located from the management data after the execution interruption of the DDL transaction, and the DDL transaction starts to be continuously executed from the abnormal interruption point without redo or rollback from the beginning, thereby greatly improving the success rate of the DDL transaction.

303: the computing device reads a next block following the last block or any block following the next block, and processes each data record stored in the block.

In some embodiments, since each block is stored in the data table in sequence, after locating a last block processed before the execution interruption, all the blocks preceding the last block are processed, without re-processing. It is only necessary to locate a next block following the last block from the data table and continue executing the DDL transaction from the next block following the last block.

For example, the DDL transaction is to add an index, and is abnormally interrupted at the time of scanning block 10 in the data table in the second stage. At this moment, block 10 has not been processed. Therefore, the management data records the processed blocks 1-9 instead of block 10, and it is determined that the last processed block before the abnormal interruption is block 9. Therefore, the computing device, starting from block 10 following block 9, continues executing the DDL transaction, thereby avoid rolling back the DDL transaction as a whole. Moreover, it is unnecessary to start from block 1 to redo, and the redundant workload of at most one block will be generated (that is, an interruption occurs when processing the last data record of block 10), thereby greatly improving the resource utilization rate of the database.

When continuing executing the DDL transaction starting from the next block following the last block, the computing device needs to read data in blocks for any block following the last block (including the next block or any block following the next block) since the DDL transaction is processed in blocks. That is, the computing device reads the current block, and processes each data record stored in the current block depending on the type of the DDL transaction. For example, the DDL transaction is to add an index, and a key value of the index needs to be filled for each data record.

After all the data records of the current block have been processed, a next block following the current block is read, the same processing is performed on each data record in the next block, and so on. The foregoing operation is iteratively executed until there is no block needing to be processed, namely, all the blocks have been processed, and the following step 306 is performed.

304: the computing device obtains, in response to a progress query instruction for the DDL transaction, a data progress of the DDL transaction based on the management data and a total number of data blocks required to be processed by the DDL transaction.

In this embodiment of the present disclosure, a function of querying a data progress of a DDL transaction in real time externally is provided. Since blocks are taken as minimum units for processing the DDL transaction, the number of block currently processed by the DDL transaction (namely, the number of blocks recorded in the management data) is compared with the total number of blocks to be processed by the DDL transaction. That is, the data progress of the DDL transaction is obtained.

In some embodiments, the computing device determines a value obtained by dividing the number of blocks recorded in the management data by the total number of blocks as the data progress of the DDL transaction. In some embodiments, the data progress of the DDL transaction is determined after converting the value into a percentage, or other linear or non-linear mapping is performed. This embodiment of the present disclosure is not specifically limited thereto.

305: the computing device returns the data progress of the DDL transaction to a device triggering the progress query instruction.

In some embodiments, for a stand-alone database system, a user inputs a progress query instruction on the computing device, and a database engine queries from an underlying layer and returns a data progress of the DDL transaction. At this moment, the data progress is visually displayed by the computing device. For a cluster database system, a device for a user to input a progress query instruction is generally different from the computing device for processing the DDL transaction. At this moment, the computing device returns a data progress of the DDL transaction to the device at the user side based on the progress query instruction. The data progress is visually displayed by the device at the user side.

In some embodiments, a value of the data progress is directly displayed in the form of text, or the data progress is updated in real time in the form of a progress bar, or the change of the data progress is dynamically displayed in the form of animation, or the like. The display mode of the data progress is not specifically limited in this embodiment of the present disclosure. The progress bar includes: a bar progress bar, a sector progress bar, a ring progress bar, and the like.

Schematically, the user may input the following code to incidentally display the data progress of the DDL transaction while inputting the DDL statement. For example, the DDL transaction is to create a new data table:

```
MySQL [test]> show create table t1;
+-------+----------------------------------------------------------------------------------+
| Table | Create Table |
+-------+----------------------------------------------------------------------------------+
| t1    |CREATE TABLE 't1' (
  'a' int NOT NULL,
  'b' int DEFAULT NULL,
  PRIMARY KEY ('a'),       /* public */
  KEY 'idx1' ('b')         /* write only 66%, parallel degree 24*/
) ENGINE=InnoDB DEFAULT CHARSET=utf8mb3 |
+-------+----------------------------------------------------------------------------------+
1 row in set (0.00 sec)
```

* public * represents that a current state of a primary key index is public, namely, a normal state. Generally, after the execution of the DDL transaction is completed, an object operated by the DDL transaction will be displayed as a public state, and it indicates that the object is currently in a stage capable of normally providing a service for a user.

* write only 66%, parallel degree 24 * represents that a current state of a secondary index idx1 is write only, that is, in the stage of scanning table data to generate index data during the index creation process. It also shows that the data progress of the currently created index is 66%, and the data is processed in parallel with a parallel degree of 24.

306: the computing device commits the DDL transaction in response to each data block operated by the DDL transaction being processed.

Step 306 is similar to step 203, and will not be described in detail herein.

All the foregoing example technical solutions may be combined in different manners to form other embodiments of the present disclosure, and will not be described in detail herein.

In the technical solution provided by this embodiment of the present disclosure, data blocks are taken as minimum units for processing a DDL transaction. In the execution interruption of the DDL transaction, a last data block processed before the interruption can be conveniently located. It is not required to roll back the DDL transaction as a whole, but to continue, starting from a next data block, executing the DDL transaction, thereby avoiding the redundant workload caused by redoing the DDL transaction, improving the success rate of the DDL transaction indicated by a DDL statement, and improving the resource utilization rate of a database.

The foregoing embodiment introduces the serial resumption processing flow of the DDL transaction in the execution interruption in detail. Since parallel processing is supported in addition to serial processing, the parallel resumption processing flow of the DDL transaction in the execution interruption will be described in detail in this embodiment of the present disclosure.

Figure 4:
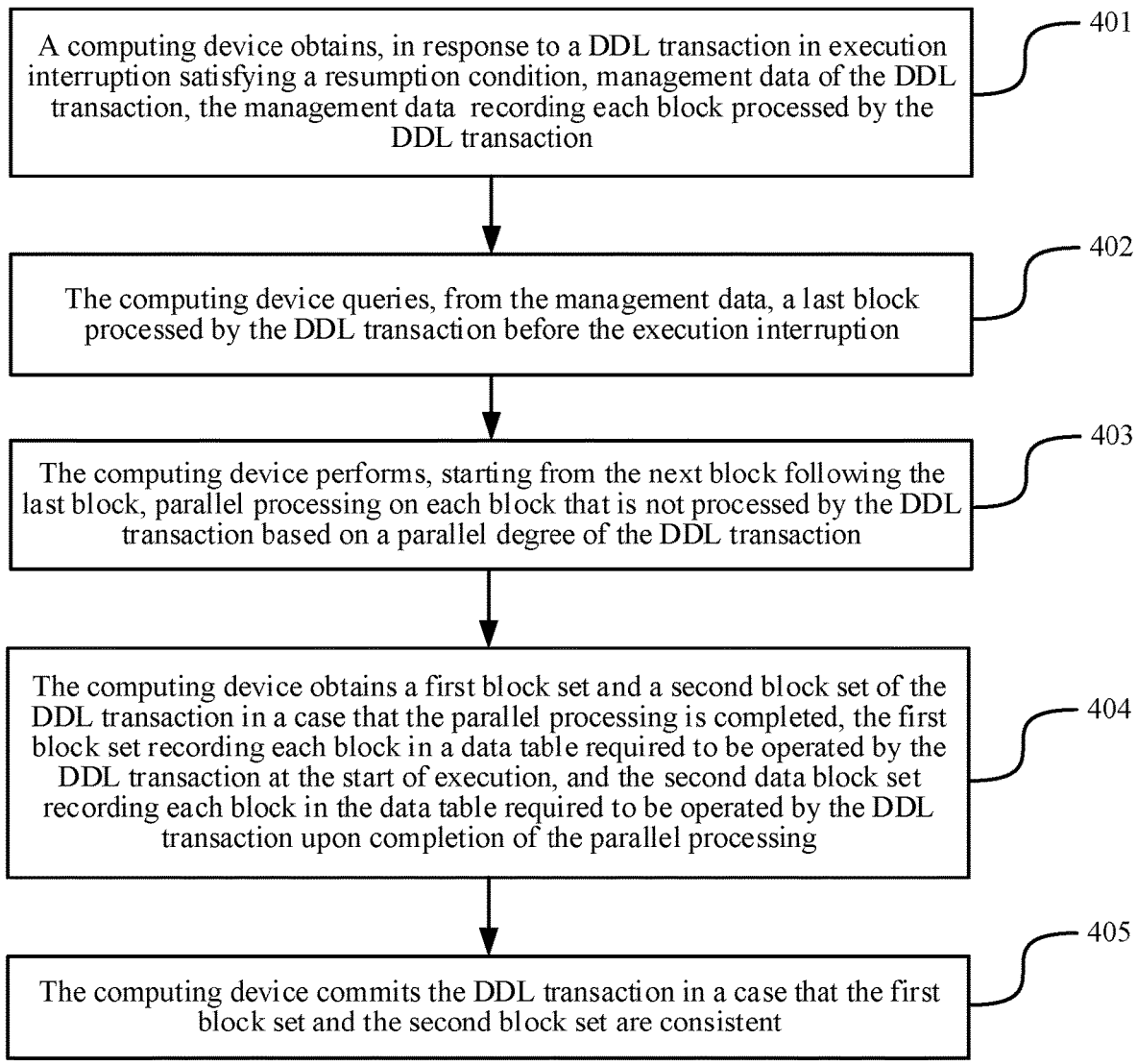
FIG. 4 is a flowchart of a transaction execution method according to an embodiment of the present disclosure.

FIG. 4 is a flowchart of a transaction execution method according to an embodiment of the present disclosure, which may be performed by any computing device in a database system. The database system includes: a stand-alone database system, a cluster database system, a distributed database system, a cloud native database architecture with separated computing and storage, a blockchain system, and the like. This embodiment includes the following exemplary steps.

401: the computing device obtains, in response to a DDL transaction in execution interruption satisfying a resumption condition, management data of the DDL transaction, the management data recording each block processed by the DDL transaction.

Step 401 is similar to step 301, and will not be described in detail herein.

402: the computing device queries, from the management data, a last block processed by the DDL transaction before the execution interruption.

Step 402 is similar to step 302, and will not be described in detail herein.

403: the computing device performs, starting from the next block following the last block, parallel processing on each block that is not processed by the DDL transaction based on a parallel degree of the DDL transaction.

The parallel degree refers to: how many parallel processing tasks will be started in parallel processing to decompose original tasks required to be processed. Generally, in computer processing, full data originally required to be processed is divided into several subtasks. A specified number of threads of parallel degree are started. Subtasks are obtained and processed according to corresponding processing logic. Ideally, parallel execution can achieve the multiple performance improvement of the parallel degree. For example, in a serial processing mode, full table data is scanned by a single DDL thread. In a parallel processing mode, assuming that the parallel degree is 10, the full table data is scanned in parallel by 10 DDL threads.

In some embodiments, the parallel degree is preset by the database engine. For example, a certain default value is preset (for example, the parallel degree is 5). For another example, multiple parallel degrees are preset, and a data volume interval associated therewith is established for each parallel degree to form a mapping relationship between the parallel degree and the data volume interval. According to a data volume involved in an object operated by the DDL transaction, the parallel degree having the mapping relationship with the data volume interval in which the data volume is located is selected. For another example, the parallel degree adopted by the DDL transaction before the execution interruption is inherited by default, or the parallel degree adopted by the previous DDL transaction is inherited. For another example, the parallel degree is set by a technical person after the execution interruption. The manner of obtaining the parallel degree is not specifically limited in this embodiment of the present disclosure.

In step 403, starting from the next block following the last block, the DDL transaction continues to be executed. Unlike step 303, serial processing is converted to parallel processing. In the parallel processing mode, based on the parallel degree of the DDL transaction (different DDL transactions have the same or different parallel degrees, which is not limited herein), an originally single DDL transaction may be divided into multiple DDL sub-transactions. The number of DDL sub-transactions is equal to the parallel degree of the DDL transaction, and the multiple DDL sub-transactions are processed in parallel by processes or threads with the number of parallel degrees, respectively. In addition, in order to avoid the redundant workload, there is no identical block in different DDL sub-transactions, thereby avoiding the redundant workload caused by repeatedly scanning a certain block for multiple times in parallel processing. When each DDL thread or process processes a DDL sub-transaction allocated thereto in the parallel processing mode, the same manner as the DDL thread or process processes the DDL transaction in the serial processing mode is used, and will not be described in detail herein.

These processes or threads may be implemented using multi-threaded parallel processing capability in a stand-alone database, and these processes or threads may be distributed across multiple computing devices in a clustered database, so as to achieve the effect of distributed parallel processing, thereby relieving the computational pressure of a single node.

In some embodiments, when the DDL transaction is divided into multiple DDL sub-transactions based on the parallel degree, a total number of blocks to be processed by the DDL transaction may be divided equally, whereby tasks allocated on different processes or threads are more load balanced.

In other embodiments, when the DDL transaction is divided into multiple DDL sub-transactions based on the parallel degree, since the respective processes or threads of the DDL sub-transactions may not be located on the same computing device and currently available computing resources of the computing device where the DDL sub-transactions are located are not all the same, it is unnecessary to divide equally according to the total number of blocks to be processed by the DDL transaction, but to flexibly allocate the currently available computing resources of the computing device where the DDL sub-transactions are located. For example, when the currently available computing resources are greater than a preset threshold, there are more blocks to be scanned in the allocated DDL sub-transactions. When the currently available computing resources are less than or equal to the preset threshold, there are less blocks to be scanned in the allocated DDL sub-transactions. The preset threshold is a fixed value or a percentage. This embodiment of the present disclosure is not specifically limited thereto.

In other embodiments, when the DDL transaction is divided into multiple DDL sub-transactions based on the parallel degree, a distributed scenario is taken as an example. Since different blocks may be stored on different computing devices in a distributed manner, the targeted division of DDL sub-transactions is performed for each computing device according to the computing device on which the different blocks are located. For example, computing devices involved in the object operated by the DDL transaction are first determined, and then the DDL sub-transactions of data stored on the computing device are allocated for each computing device.

404: the computing device obtains a first block set and a second block set of the DDL transaction after the parallel processing is completed, the first block set recording each block in a data table required to be operated by the DDL transaction at the start of execution, and the second data block set recording each block in the data table required to be operated by the DDL transaction upon completion of the parallel processing.

The user service is capable of modifying the data during the online DDL execution (adopting the Thomas write rule). Therefore, when the DDL transaction scans a full table, the block may be split. That is, an original block is split into multiple blocks due to the insertion of a data record, and the split new block may be missed under parallel scanning, thus resulting in data inconsistency. Therefore, after the parallel processing is completed, a first block set and a second block set are obtained by performing step 404, so as to solve the problem of inconsistency caused by block splitting.

The first block set refers to a set formed by collecting all block IDs in a data table to be scanned when the DDL transaction starts parallel scanning in the second stage, and is denoted as blockIdInit as a baseline of parallel scanning.

The second block set refers to a set formed by all block IDs in the data table to be scanned once again after the DDL transaction ends parallel scanning in the second stage, and is denoted as blockIdCur. By comparing the first block set and the second block set, as long as a block splitting phenomenon occurs, the number of block IDs in the second block set needs to be greater than that in the first block set, whereby some blocks generated by splitting can be prevented from missing.

In some embodiments, when parallel scanning is started (generally before the execution interruption), a first block set is stored once. When execution is resumed after the execution interruption, once the parallel scanning is completed, the first block set is read from a cache and collected again to obtain a second block set. The sizes of the first block set and the second block set are compared, namely, block IDs (namely, set elements) stored in the first block set and the second block set are compared. If the first block set is consistent with the second block set, no block splitting occurs in this data table during the execution of DDL, the following step 405 is performed, and the DDL transaction is directly committed. If the first block set is inconsistent with the second block set, block splitting has occurred in this data table during the execution of DDL. That is, the second block set has an added block than the first block set. The computing device then determines the added block in the second block set compared with the first block set, and commits the DDL transaction after the added block is processed.

In some embodiments, serial processing is performed on the foregoing added block, namely, the same operation as step 303 in the previous embodiment is performed, or parallel processing is performed on the foregoing added block, namely, step 403 (switching to another parallel degree or adopting an original parallel degree) is re-performed. This embodiment of the present disclosure is not specifically limited thereto.

405: the computing device commits the DDL transaction when the first block set and the second block set are consistent with each other.

The process of committing the DDL transaction in step 405 is similar to the process of committing the DDL transaction in step 306, and will not be described in detail herein.

In this embodiment of the present disclosure, operations similar to step 304 and step 305 may also be executed to obtain and return the data progress of the DDL transaction to the device at the user side in the parallel processing mode. In some embodiments, a total data progress of the DDL transaction may be obtained and returned. In addition, respective sub-data progresses for each DDL sub-transaction may be obtained and returned, and the set parallel degree to the device at the user side may be returned, so as to improve the human-computer interaction efficiency.

All the foregoing example technical solutions may be combined in different manners to form other embodiments of the present disclosure, and will not be described in detail herein.

In the technical solution provided by this embodiment of the present disclosure, data blocks are taken as minimum units for processing a DDL transaction. In the execution interruption of the DDL transaction, a last data block processed before the interruption can be conveniently located. It is not required to roll back the DDL transaction as a whole, but to continue, starting from a next data block, executing the DDL transaction, thereby avoiding the redundant workload caused by redoing the DDL transaction, improving the success rate of the DDL transaction indicated by a DDL statement, and improving the resource utilization rate of a database.

The foregoing two embodiments introduce the flow of processing a DDL transaction by serial resumption after execution interruption and the flow of processing a DDL transaction by parallel resumption in detail. In this embodiment of the present disclosure, the flow of serial processing in an online DDL scenario is described in detail with an example where the DDL transaction is to add an index.

Online DDL transactions are generally divided into two categories: DDL transactions which can be completed only by modifying a definition of a table in a data dictionary, for example, by adding a data column to a data table, and only modifying the definition of the table in an online DDL execution flow; and DDL transactions which not only is required to modify the definition of the table in the data dictionary, but also completes the process of creating data of a corresponding object based on the data of the table, for example, adding an index to the data table, modifying a definition of the index, and also scanning the full table data and creating a key information content (namely, a key value) corresponding to the index using column information related to the corresponding index.

This embodiment of the present disclosure mainly achieves redoing after interruption for the latter case. In the former case, it is unnecessary to scan the full table data, and if roll-back occurs due to abnormality, the next re-execution only needs to modify the definition of the table in the data dictionary. Therefore, the cost of redoing is not great.

Figure 5:
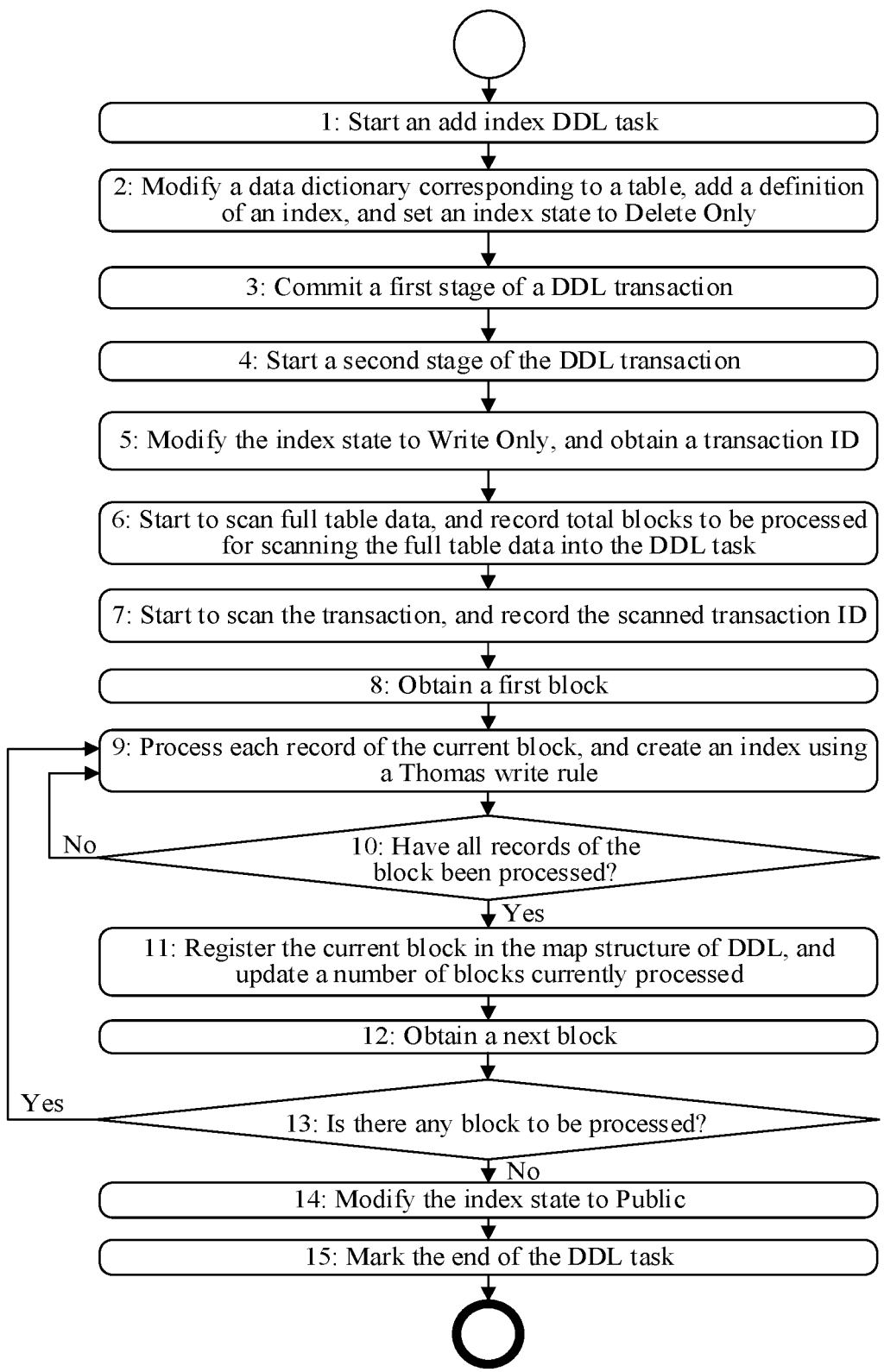
FIG. 5 is a flowchart of normal execution of online index adding according to an embodiment of the present disclosure.

FIG. 5 is a flowchart of normal execution of online index adding according to an embodiment of the present disclosure, which may be performed by any computing device in a database system, and describes an example where a DDL transaction is to add an index on line.

Step 1: start an add index DDL task.

Step 2: modify a data dictionary corresponding to a data table, add an index to a table structure, and set a current state of the index to be a delete only state, only a deletion operation on the index being allowed in the delete only state.

Step 3: commit a transaction, and store a new table structure into the data dictionary.

Step 4: start to execute DDL in a second stage.

Step 5: modify, after obtaining a corresponding permission, the index state to a write only state, and also obtain a transaction ID.

The step of obtaining the permission may improve the security of the DDL transaction, but it is not necessary to modify the index state after obtaining the permission, and it is also supported to modify the index state directly without obtaining the permission to improve the execution efficiency of the DDL transaction. This embodiment of the present disclosure is not specifically limited thereto.

After the index is modified into the write only state, subsequent modifications to this table will be synchronized into the index, and when the write only state is successfully set, if there are still uncommitted modification transactions to the table, these modification transactions will be rolled back, whereby the correctness of creating the index can be ensured.

Step 6: start to scan a full table and complete the following tasks:

Step 6.1: take the transaction ID obtained in step 5 as a transaction ID for scanning and establishing a secondary index data transaction.

Step 6.2: collect total blocks included in the table, and register the blocks in a DDL task as total blocks of the DDL task.

In other words, in step 6, full table data starts to be scanned, and total blocks to be processed for scanning the full table data are recorded into the DDL task.

Step 7: start scanning, and record the transaction ID in the DDL task.

Step 8: obtain a first block.

Step 9: process each data record in the block, extract a corresponding data field to create a key of a secondary index, and write into an index structure using a Thomas write rule. Since the transaction ID is applied when the index state becomes write only, previously uncommitted transactions are all rolled back according to the Thomas write rule. In addition, the foregoing transaction of scanning and creating an index is older than any subsequent transaction of users for table modification. Therefore, if there is a conflict therebetween, it is only necessary to retain the subsequent modification of users to the corresponding data of the table.

Step 10: determine whether a data record in the block is processed. If yes, that is, the data record in the block is processed, the process proceeds to step 11. If no, that is, the data record in the block has not been processed, the process returns to step 9 to continue the processing of a next data record.

Step 11: register that the block has been scanned in management data (such as a Map dynamic array structure) of DDL, and update a total number of updated blocks, namely, a processed block num.

In other words, in step 11, a current block is registered in a Map structure of DDL, and the number of blocks currently processed (namely, processed block num) is updated.

A data progress of the DDL transaction is equal to the processed block num/total blocks. When the user uses a show create table statement, an execution progress of the current DDL transaction is obtained by computation, so as to perform foreground visual display.

Step 12: obtain a next block.

Step 13: determine whether there is any block to be processed. If yes, that is, there are still blocks to be processed, and the process returns to step 9 to continue processing. If no, that is, there is no block to be processed, the index creation process ends, and the process proceeds to step 14.

Step 14: modify an index state to public (indicating that the index is created and can be normally used).

Step 15: mark the end of the DDL task.

The process of scanning a full table and creating a secondary index in step 6 to step 13 can also take a parallel implementation manner to accelerate index creation. The flow of parallel adaptation will be described in detail in the subsequent embodiments, and will not be described in detail.

Figure 6:
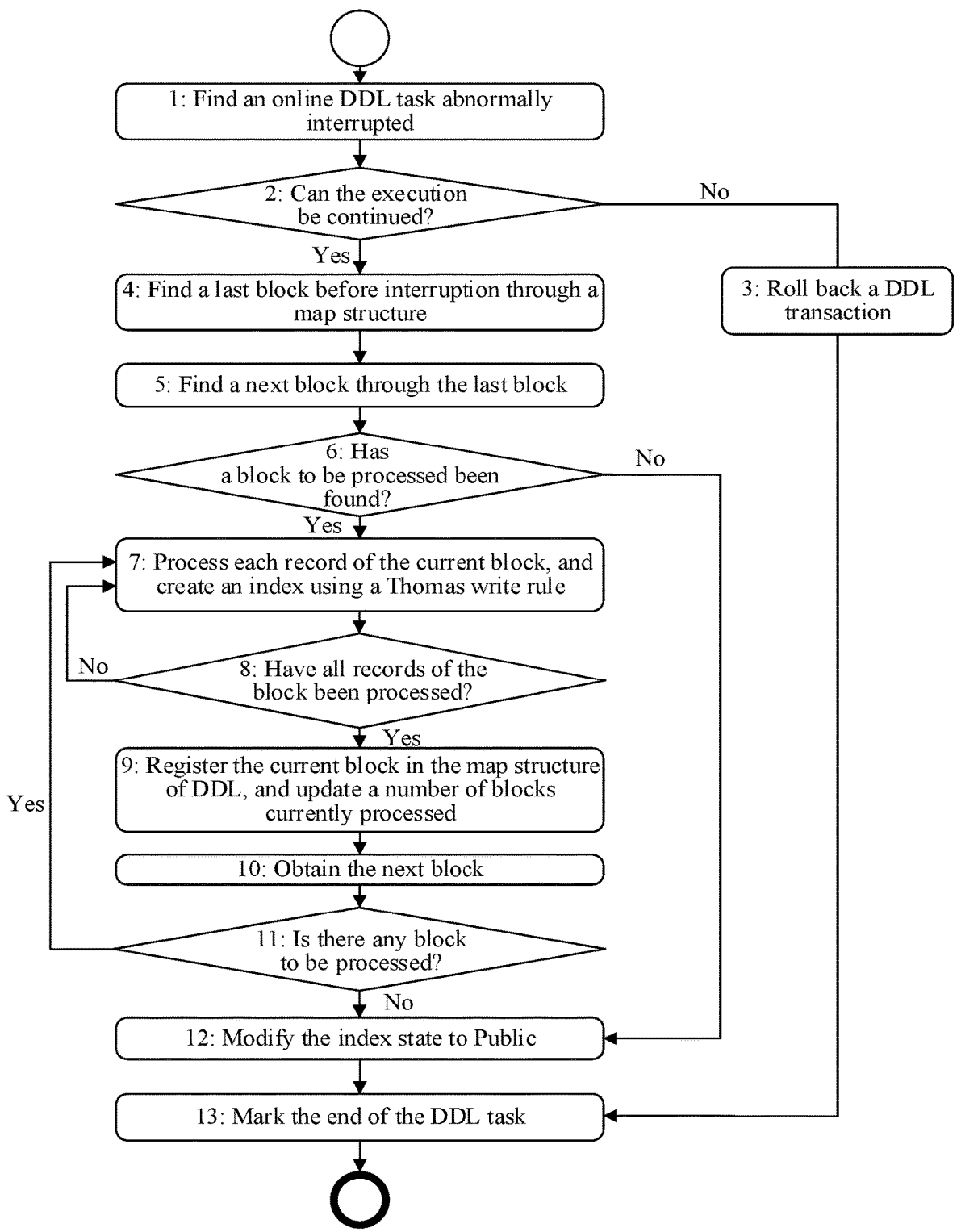
FIG. 6 is a flowchart of resumption of online index adding after abnormal interruption according to an embodiment of the present disclosure.

FIG. 6 is a flowchart of resumption of online index adding after abnormal interruption according to an embodiment of the present disclosure. Referring to FIG. 6, this embodiment is performed by any computing device in a database system, and describes an example where a DDL transaction is to add an index on line.

Step 1: find an add index task abnormally interrupted in a background thread.

Step 2: determine whether the execution can be continued. If no, that is, the execution cannot be continued, the process proceeds to step 3. If yes, that is, execution can be continued, the process proceeds to step 4.

There are two cases in which the interrupted execution cannot be continued:

In case (I), if the DDL has not completed the first stage, there is no information about the index in a table structure, the DDL transaction cannot be continued, and the DDL transaction will be rolled back.

In case (II), if block data cannot be read out due to a hardware problem, the DDL transaction cannot be continued, and the DDL transaction will be rolled back. Since some databases have achieved the consistency of block data at present, multiple copies generally exist in each block in the database to ensure that data will not be lost even if a hardware disk fault occurs. Therefore, case (II) will only occur in the extreme case where all copies on all machines are not available, but the probability is almost 0.

Step 3: roll back a DDL transaction, and proceed to step 13.

Step 4: find a last processed block from management data (such as a Map dynamic array structure) recorded in the DDL task.

Step 5: find a next block through the last block found in step 4.

In some embodiments, for a heap table structure, the last block is located through a file and then moved to the next block in sequence.

In some embodiments, for a B+ tree structure, the next block can be linked through the last block.

In some embodiments, if a region is used as the logical organization of data, a corresponding next region can be found through the region to continue scanning.

Step 6: Determine whether the next block is found. If yes, that is, the next block is found, the process proceeds to step 7. If no, that is, the next block is not found, the process proceeds to step 12.

Step 7: Process each data record in the block, extract a corresponding data field to create a key of a secondary index, and write into an index structure using a Thomas write rule. Since the transaction ID is applied when the index state becomes write only, previously uncommitted transactions are all rolled back according to the Thomas write rule. In addition, the foregoing transaction of scanning and creating an index is older than any subsequent transaction of users for table modification. Therefore, if there is a conflict therebetween, it is only necessary to retain the subsequent modification of users to the corresponding data of the table.

Step 8: Determine whether a data record in the block is processed. If yes, that is, the data record in the block is processed, the process proceeds to step 9. If no, that is, the data record in the block has not been processed, the process returns to step 7 to continue the processing of a next data record.

Step 9: Register that the block has been scanned in management data (such as a Map dynamic array structure) of DDL, and update a total number of updated blocks, namely, a processed block num.

In other words, in step 9, a current block is registered in a Map structure of DDL, and the number of blocks currently processed (namely, processed block num) is updated.

A data progress of the DDL transaction is equal to the processed block num/total blocks. When the user uses a show create table statement, an execution progress of the current DDL transaction is obtained by computation, so as to perform foreground visual display.

Step 10: Obtain a next block.

Step 11: Determine whether there is any block to be processed. If yes, that is, there are still blocks to be processed, and the process returns to step 7 to continue processing. If no, that is, there is no block to be processed, the index creation process ends, and the process proceeds to step 12.

Step 12: Modify an index state to public (indicating that the index is created and can be normally used).

Step 13: Mark the end of the DDL task.

In a serial processing mode, if the resumption after interruption occurs during the execution of an online DDL transaction, block splitting or merging is analyzed to verify the correctness of the resumption after interruption.

In the first scenario, a split or merged block has been scanned.

Figure 7:
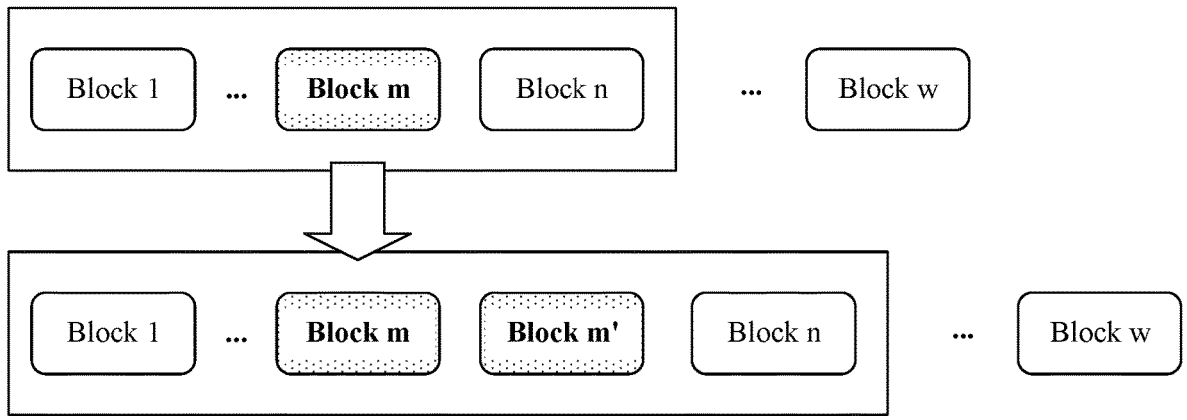
FIG. 7 is a schematic diagram of block splitting according to an embodiment of the present disclosure.

FIG. 7 is a schematic diagram of block splitting according to an embodiment of the present disclosure. It is assumed that block n is an interruption breakpoint. Block m (m<n) having been scanned prior to block n is split into block m and block m'. Generally, the reason for block splitting is that a data record is added to block m, or a field of the data record therein is modified so as to exceed the capacity of the block, thereby splitting into two blocks. Since the index state at the beginning of scanning is write only, all the additions or modifications to the records in block m will be reflected in a new index. Therefore, the changes of this part of data will be synchronized into the index. FIG. 7 shows a case where block m is split to the right. If block m is split to the left, there will be no influence.

Merging blocks can be seen as a reverse operation of splitting blocks. The change process from bottom to top in FIG. 7 is: merging block m and block m' into block m. Generally, the blocks are merged since data records are deleted or modified in block m or block m', resulting in that the space usage amount or space usage rate in block m or block m' is less than a certain threshold. In order to better use space, the two blocks will be merged into block m in the above figure. As in the split case above, the deletion of the data records or the modification of the data records is also updated into the index. Therefore, the index data is correct.

In summary, in the first scenario, it is only necessary to continue scanning from a next block following block n and complete the index filling, because all the modifications after the index changes to the write only state will be synchronized into the index, so as to ensure the consistency of data.

In the second scenario, a split or merged block is a currently scanned block.

The second scenario is also divided into two cases: the currently processed data is recorded in the split block m; and the currently processed data is recorded in the split block m'.

Figure 8:
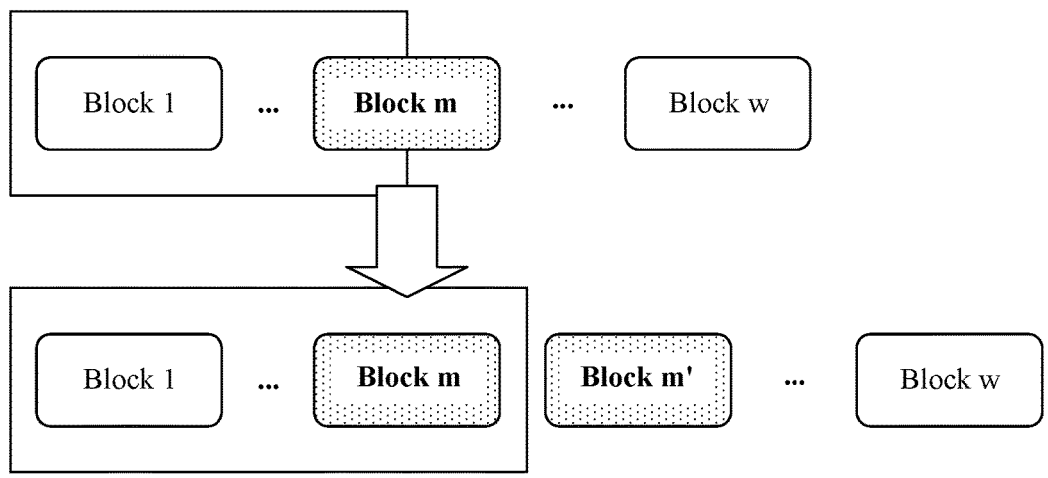
FIG. 8 is a schematic diagram of block splitting according to an embodiment of the present disclosure.

FIG. 8 is a schematic diagram of block splitting according to an embodiment of the present disclosure. It is assumed that a DDL transaction is interrupted while block m is currently being processed, a task is restarted after the interruption, and block m is split into block m and block m'. At this moment, completed block m−1 preceding block m is found, and rescanning is started from block m following block m−1. If the scanned data records have been previously scanned and filled into an index, the block scanned for multiple times will be discarded because of a Thomas write rule. Therefore, a redundant workload of data records accommodated by at most one block will be generated. That is, assuming that block m has been scanned until the last data record, it is equivalent to reprocessing block m once and then discarding the block after interruption.

The foregoing two embodiments introduce the normal serial processing flow and the resumption flow after interruption of the DDL transaction in the online DDL scenario in detail, while in this embodiment and a next embodiment of the present disclosure, the normal serial processing flow and the resumption flow after interruption of the DDL transaction in the offline DDL scenario will be described in detail.

Figure 9:
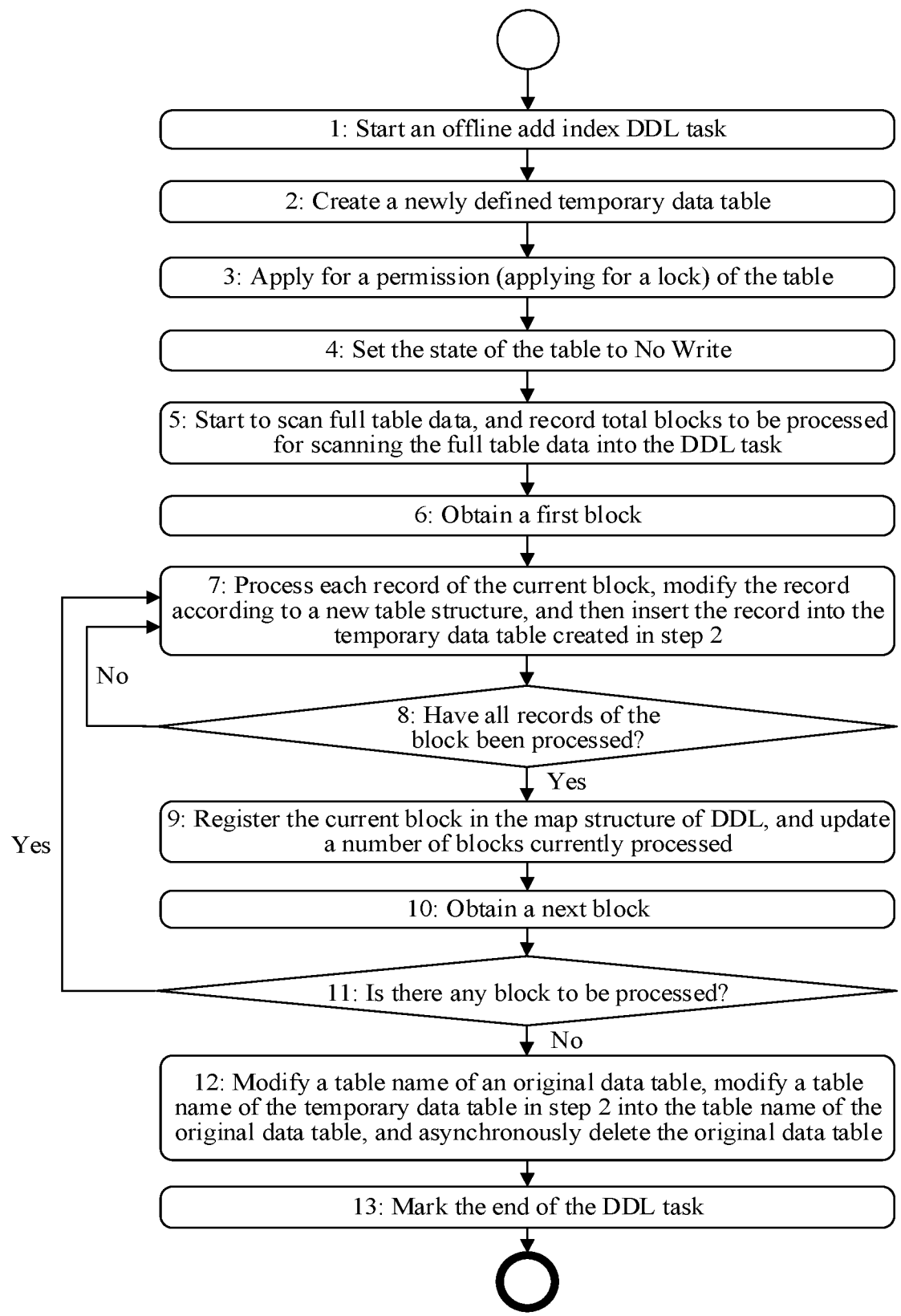
FIG. 9 is a flowchart of normal execution of offline index adding according to an embodiment of the present disclosure.

FIG. 9 is a flowchart of normal execution of offline index adding according to an embodiment of the present disclosure. Referring to FIG. 9, this embodiment is performed by any computing device in a database system, and describes an example where a DDL transaction is to add an index off line.

Step 1: Start an offline (non-online) add index DDL task.

Step 2: Create a temporary data table of a table structure after DDL execution, that is, create a newly defined temporary data table.

Step 3: Apply for a permission (applying for a lock) corresponding to the data table.

It is necessary to apply for distributed locks for a distributed database.

Step 4: Set a table state to a no write state.

The no write state is a table state in a special offline DDL scenario. When a table definition is set to the no write state, other nodes in the distributed database are not allowed to perform or commit a transaction for table modification. Even if the transaction of the table state started before entering the no write state finds that the table state changes to no write when committing, a database engine will also refuse the transaction commission.

Step 5: Start to scan a full table, collect total blocks included in the table, and register the blocks in a DDL task as total blocks of the DDL task.

In other words, in step 5, full table data starts to be scanned, and total blocks to be processed for scanning the full table data are recorded into the DDL task.

Step 6: Obtain a first block.

Step 7: Process each data record in the block, combine each data record in an original data table into a new data record according to a new data table structure, and insert the temporary data table created in step 2, namely, insert the temporary data table created in step 2 after being modified according to the new table structure.

Step 8: Determine whether a data record in the block is processed. If yes, that is, the data record in the block is processed, the process proceeds to step 9. If no, that is, the data record in the block has not been processed, the process returns to step 7 to continue the processing of a next data record.

Step 9: Register that the block has been scanned in management data (such as a Map dynamic array structure) of DDL, and update a total number of updated blocks, namely, a processed block num.

In other words, in step 9, a current block is registered in a Map structure of DDL, and the number of blocks currently processed (namely, processed block num) is updated.

A data progress of the DDL transaction is equal to the processed block num/total blocks. When the user uses a show create table statement, an execution progress of the current DDL transaction is obtained by computation, so as to perform foreground visual display.

Step 10: Obtain a next block.

Step 11: Determine whether there is any block to be processed. If yes, that is, there are still blocks to be processed, and the process returns to step 7 to continue processing. If no, that is, there is no block to be processed, the index creation process ends, and the process proceeds to step 12.

Step 12: Modify a table name of the original data table, modify a table name of the temporary data table created in step 2 into the table name of the original data table, and asynchronously delete the original data table.

Step 13: Mark the end of the DDL task.

The process of scanning a full table and creating a secondary index in step 5 to step 11 can also take a parallel implementation manner to accelerate index creation. The flow of parallel adaptation will be described in detail in the subsequent embodiments, and will not be described in detail.

Figure 10:
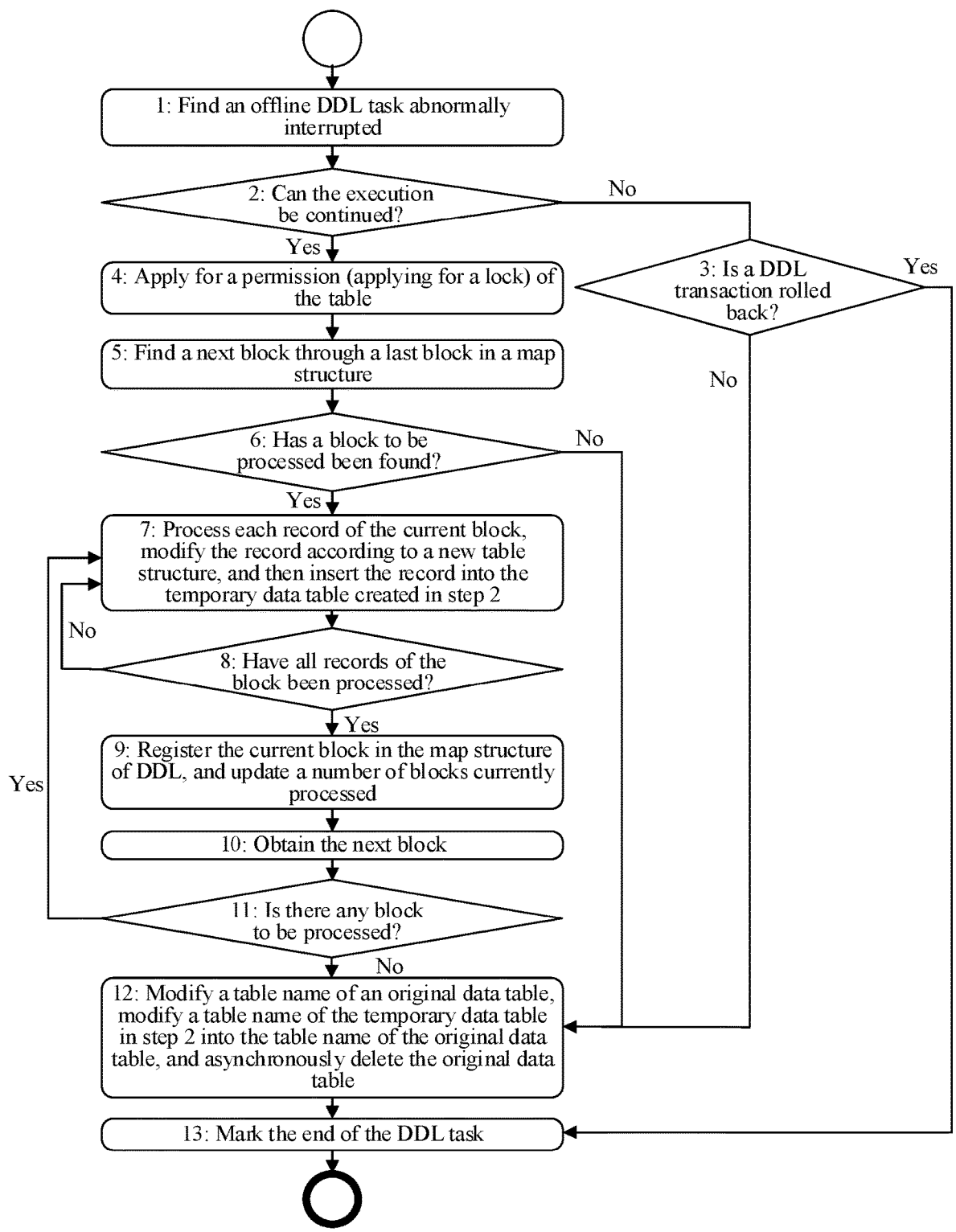
FIG. 10 is a flowchart of resumption of offline index adding after abnormal interruption according to an embodiment of the present disclosure.

FIG. 10 is a flowchart of resumption of offline index adding after abnormal interruption according to an embodiment of the present disclosure. Referring to FIG. 10, this embodiment is performed by any computing device in a database system, and describes an example where a DDL transaction is to add an index off line.

Step 1: Find a DDL task abnormally interrupted in a background thread.

Step 2: Determine whether the execution can be continued. If yes, that is, both an original data table and a temporary data table exist, scanning needs to be resumed from an interruption point of a table scanning process, and the process proceeds to step 4. If no, that is, the foregoing case is not satisfied and at least one of the original data table or the temporary data table does not exist, the process proceeds to step 3.

Step 3: Determine whether to roll back a DDL transaction. If yes, the process proceeds to step 13, that is, only the original data table exists and the temporary data table has not been created, and the DDL transaction is rolled back. If no, there are three cases: a) the original data table is renamed successfully, the temporary data table also exists, the scanning of the full table has been ended, and the process continues; b) the temporary data table is renamed to the original data table, the temporary data table after renaming the original data table also exists, the process continues to advance, the temporary data table is deleted from the data dictionary, and a data record in the temporary data table is deleted asynchronously; and c) the temporary data table is renamed to the original data table, the temporary data table after renaming the original data table does not exist, the process continues to advance, it is confirmed that the data record in the temporary data table is deleted asynchronously, and if any one of a) to c) is satisfied, the process proceeds to step 12.

Step 4: Apply for a corresponding modification permission (apply for a lock) of the table, where the state of the table is also a no write state.

Step 5: Find a last processed block from management data (such as a Map dynamic array structure) recorded in the DDL task.

Step 6: Determine whether the next block is found. If yes, that is, the next block is found, the process proceeds to step 7. If no, that is, the next block is not found, the process proceeds to step 12.

Step 7: Process each data record in the block, combine each data record in an original data table into a new data record according to a new data table structure, and insert the temporary data table created in step 2, namely, insert the temporary data table created in step 2 after being modified according to the new table structure.

Step 8: Determine whether a data record in the block is processed. If yes, that is, the data record in the block is processed, the process proceeds to step 9. If no, that is, the data record in the block has not been processed, the process returns to step 7 to continue the processing of a next data record.

Step 9: Register that the block has been scanned in management data (such as a Map dynamic array structure) of DDL, and update a total number of updated blocks, namely, a processed block num.

In other words, in step 9, a current block is registered in a Map structure of DDL, and the number of blocks currently processed (namely, processed block num) is updated.

Step 10: Obtain a next block.

Step 11: Determine whether there is any block to be processed. If yes, that is, there are still blocks to be processed, and the process returns to step 7 to continue processing. If no, that is, there is no block to be processed, the index creation process ends, and the process proceeds to step 12.

Step 12: Modify a table name of the original data table, modify a table name of the temporary data table created in step 2 into the table name of the original data table, and asynchronously delete the original data table.

Step 13: Mark the end of the DDL task.

In the foregoing embodiment, by setting the state of the table to no write during offline (non-online) DDL execution, it is ensured that the block corresponding to the data table does not change until the DDL transaction is completed or rolled back.

The various foregoing embodiments introduce, with an example where the DDL transaction is to add an index, the normal execution flow and the abnormal interruption resumption flow in the online DDL scenario and the offline DDL scenario respectively. However, in this embodiment of the present disclosure, how to adapt to the parallel processing mode in the various application scenarios will be described. Since parallel processing is performed in blocks, two data structures for parallel processing need to be added: a first block set and a second block set.

The first block set, referred to as blockIdInit, is a set of all current block IDs collected at the beginning of scanning of a full table, and serves as a baseline for parallel scanning.

The second block set, referred to as blockIdCur, is a set of all block IDs collected once again after the parallel scanning is ended, and is used in comparison with the baseline to check whether there is any block missing due to the parallel scanning.

Only for online DDL and when adopting a parallel processing mode, it is possible to miss the block. Since a user service can modify the data record during the online DDL execution, the block will be split in the process of scanning the full table. Since the recorded block ID needs to be initialized in the parallel scanning, it will occur that the block ID which is newly split later is missed, namely, the newly split block still needs to be guaranteed to be processed before the data consistency can be guaranteed. For offline DDL and when adopting the parallel processing mode, since the user service is blocked, the block will not change during the DDL execution, the parallel scanning is completed without missing some blocks. In addition, only block splitting may cause missing, and block merging is not affected. Since two blocks will be merged into one block, blocks can be recorded in blockIdInit at the time of initialization, and therefore data will not be missed.

Figure 11:
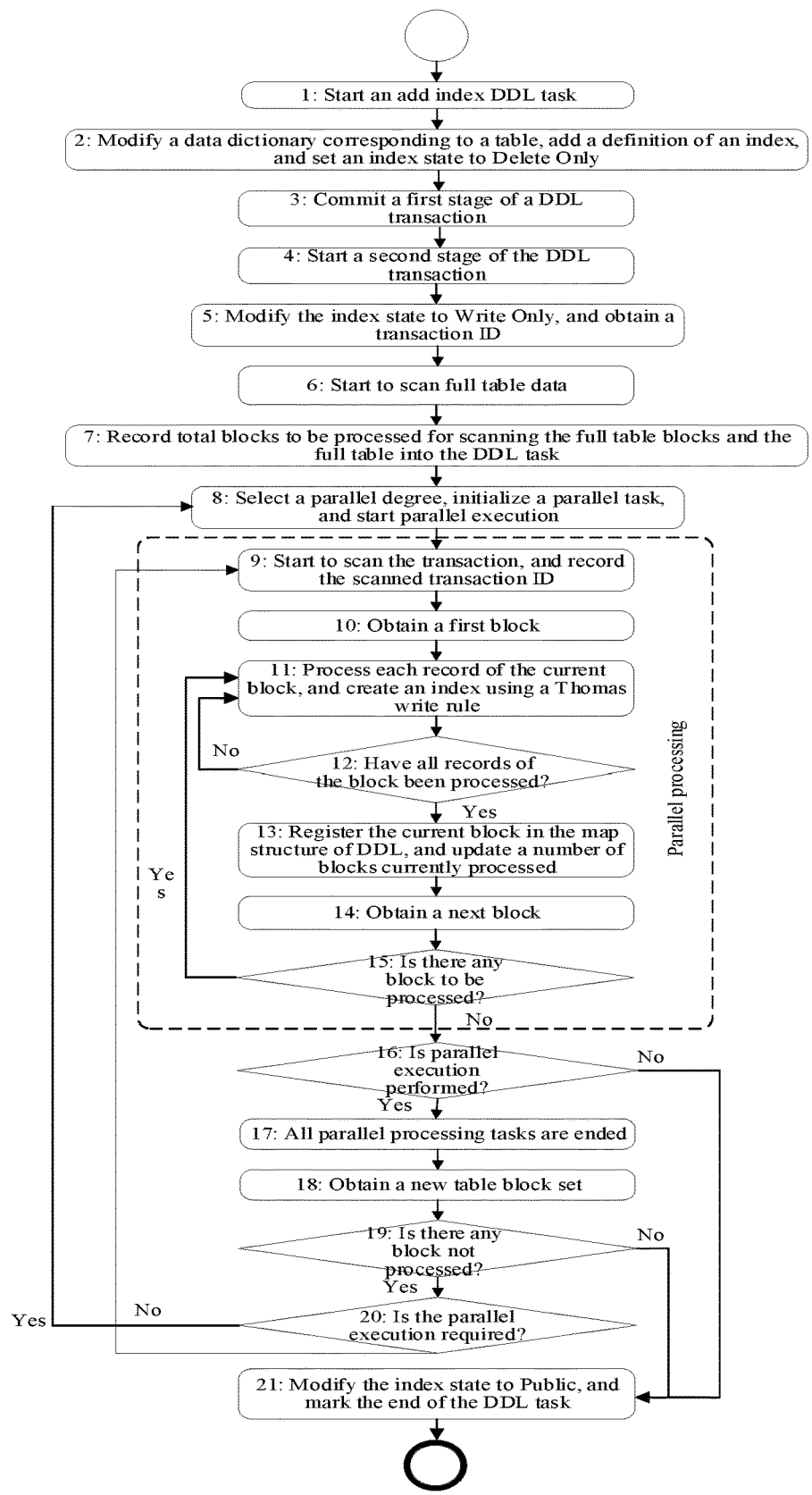
FIG. 11 is a flowchart of normal parallel execution of online index adding according to an embodiment of the present disclosure.

FIG. 11 is a flowchart of normal parallel execution of online index adding according to an embodiment of the present disclosure, which may be performed by any computing device in a database system, and describes an example where a DDL transaction is to add an index on line.

Step 1: start an add index DDL task.

Step 2: modify a data dictionary corresponding to a data table, add an index to a table structure, and set a current state of the index to be a delete only state, only a deletion operation on the index being allowed in the delete only state.

Step 3: commit a transaction, and store a new table structure into the data dictionary.

Step 4: start to execute DDL in a second stage.

Step 5: modify, after obtaining a corresponding permission, the index state to a write only state, and also obtain a transaction ID.

The step of obtaining the permission may improve the security of the DDL transaction, but it is not necessary to modify the index state after obtaining the permission, and it is also supported to modify the index state directly without obtaining the permission to improve the execution efficiency of the DDL transaction. This embodiment of the present disclosure is not specifically limited thereto.

After the index is modified into the write only state, subsequent modifications to this table will be synchronized into the index, and when the write only state is successfully set, if there are still uncommitted modification transactions to the table, these modification transactions will be rolled back, whereby the correctness of creating the index can be ensured.

Step 6: start to scan full table data, and take the transaction ID obtained in step 5 as a transaction ID for scanning and establishing a secondary index data transaction.

Step 7: collect a block ID set (first block set) of a table to be scanned, collect total blocks included in the table, and register the blocks in a DDL task as total blocks of the DDL task.

In other words, in step 7, the block ID set (first block set) to be scanned in the full table and total blocks to be processed in scanning the full table data are recorded into the DDL task.

Step 8: select an appropriate parallel degree, initialize a parallel task according to the block ID set, and start a parallel execution flow (step 9 to step 15 being a main execution flow of the parallel task).

Step 9: start scanning, and record the transaction ID in the DDL task.

Step 10: obtain a first block.

Step 11: process each data record in the block, extract a corresponding data field to create a key of a secondary index, and write into an index structure using a Thomas write rule. Since the transaction ID is applied when the index state becomes write only, previously uncommitted transactions are all rolled back according to the Thomas write rule. In addition, the foregoing transaction of scanning and creating an index is older than any subsequent transaction of users for table modification. Therefore, if there is a conflict therebetween, it is only necessary to retain the subsequent modification of users to the corresponding data of the table.

Step 12: determine whether a data record in the block is processed. If yes, that is, the data record in the block is processed, the process proceeds to step 13. If no, that is, the data record in the block has not been processed, the process returns to step 11 to continue the processing of a next data record.

Step 13: register that the block has been scanned in management data (such as a Map dynamic array structure) of DDL, and update a total number of updated blocks, namely, a processed block num.

In other words, in step 13, a current block is registered in a Map structure of DDL, and the number of blocks currently processed (namely, processed block num) is updated.

A data progress of the DDL transaction is equal to the processed block num/total blocks. When the user uses a show create table statement, an execution progress of the current DDL transaction is obtained by computation, so as to perform foreground visual display.

The modification of the same variable by parallel tasks is realized by data concurrent programming variable control.

Step 14: obtain a next block.

Step 15: determine whether there is any block to be processed. If yes, that is, there are still blocks to be processed, and the process returns to step 11 to continue processing. If no, that is, there is no block to be processed, the index creation process ends, and the process proceeds to step 16.

Step 16: determine whether to execute in parallel. If yes, namely, in a parallel processing mode, the process proceeds to step 17. If no, namely, in a serial processing mode, the process proceeds to step 21.

Step 17: determine that all parallel processing tasks are ended.

Step 18: obtain a block ID set (second block set) of the table again.

Step 19: compare the block ID set obtained in step 18 with the block ID set initialized in step 7, and determine whether there is an added (unprocessed due to block splitting) block. If there is an added block, indicating that splitting has occurred during the execution process, the process proceeds to step 20. If there is no added block, indicating that all the blocks are processed, the process proceeds to step 21.

Step 20: determine whether parallel execution is required. If yes, that is, the added blocks still need to be executed in parallel (for example, a lot of newly generated blocks are still selected to be executed in parallel), the process returns to step 8, a parallel degree is selected for a set composed of the added blocks, a parallel task is initialized, and a parallel execution flow is started. If no, that is, the added blocks do not need to be executed in parallel, and the process returns to step 9 to perform serial processing on the added blocks. This serial execution mode does not need to determine whether a block is added in the process after being ended.

Step 21: modify an index state to public (indicating that the index is created and can be normally used), and mark the DDL task as being completed.

Figure 12:
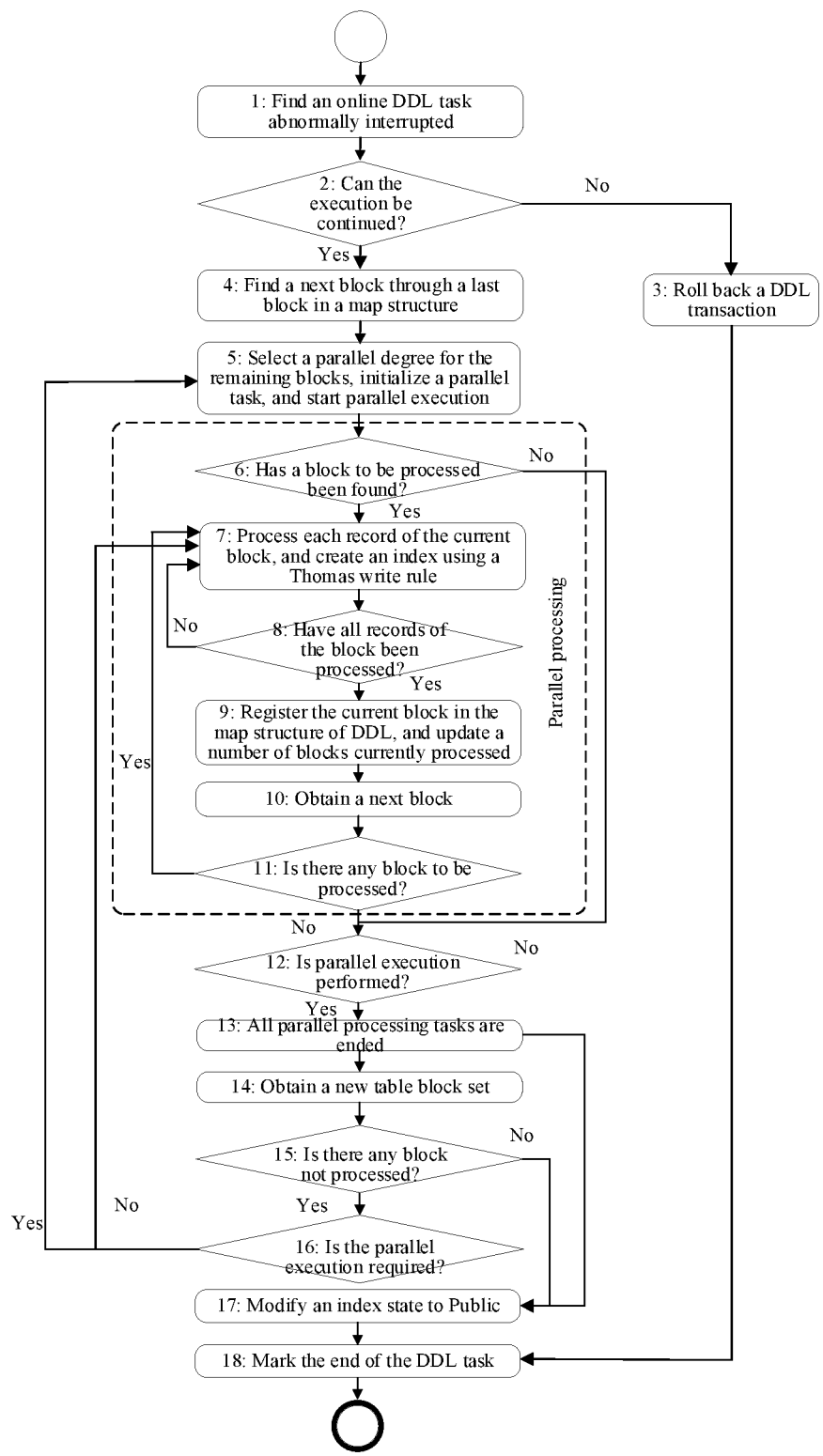
FIG. 12 is a flowchart of parallel resumption of online index adding after abnormal interruption according to an embodiment of the present disclosure.

FIG. 12 is a flowchart of parallel resumption of online index adding after abnormal interruption according to an embodiment of the present disclosure, which may be performed by any computing device in a database system, and describes an example where a DDL transaction is to add an index on line.

Step 1: find an add index task abnormally interrupted in a background thread.

Step 2: determine whether the execution can be continued. If no, that is, the execution cannot be continued, the process proceeds to step 3. If yes, that is, execution can be continued, the process proceeds to step 4.

There are two examples in which the interrupted execution cannot be continued:

In example (I), if the DDL has not completed the first stage, there is no information about the index in a table structure, the DDL transaction cannot be continued, and the DDL transaction will be rolled back.

In example (II), if block data cannot be read out due to a hardware problem, the DDL transaction cannot be continued, and the DDL transaction will be rolled back. Since some databases have achieved the consistency of block data at present, multiple copies generally exist in each block in the database to ensure that data will not be lost even if a hardware disk fault occurs. Therefore, case (II) will only occur in the extreme case where all copies on all machines are not available, but the probability is almost 0.

Step 3: roll back a DDL transaction, and proceed to step 18.

Step 4: find a last processed block from management data (such as a Map dynamic array structure) recorded in the DDL task, and search for a next block following the last block.

Step 5: select an appropriate parallel degree for the remaining blocks, initialize a parallel task, and start parallel execution.

Step 6: determine whether the next block is found. If yes, that is, the next block is found, the process proceeds to step 7. If no, that is, the next block is not found, the process proceeds to step 17.

Step 7: process each data record in the block, extract a corresponding data field to create a key of a secondary index, and write into an index structure using a Thomas write rule. Since the transaction ID is applied when the index state becomes write only, previously uncommitted transactions are all rolled back according to the Thomas write rule. In addition, the foregoing transaction of scanning and creating an index is older than any subsequent transaction of users for table modification. Therefore, if there is a conflict therebetween, it is only necessary to retain the subsequent modification of users to the corresponding data of the table.

Step 8: determine whether a data record in the block is processed. If yes, that is, the data record in the block is processed, the process proceeds to step 9. If no, that is, the data record in the block has not been processed, the process returns to step 7 to continue the processing of a next data record.

Step 9: register that the block has been scanned in management data (such as a Map dynamic array structure) of DDL, and update a total number of updated blocks, namely, a processed block num.

In other words, in step 9, a current block is registered in a Map structure of DDL, and the number of blocks currently processed (namely, processed block num) is updated.

A data progress of the DDL transaction is equal to the processed block num/total blocks. When the user uses a show create table statement, an execution progress of the current DDL transaction is obtained by computation, so as to perform foreground visual display.

Step 10: obtain a next block.

Step 11: determine whether there is any block to be processed. If yes, that is, there are still blocks to be processed, and the process returns to step 7 to continue processing. If no, that is, there is no block to be processed, the index creation process ends, and the process proceeds to step 12.

Step 12: determine whether to execute in parallel. If yes, namely, in a parallel processing mode, the process proceeds to step 13. If no, namely, in a serial processing mode, the process proceeds to step 17.

Step 13: determine that all parallel processing tasks are ended.

Step 14: obtain a block ID set (second block set) of the table again.

Step 15: compare the block ID set obtained in step 14 with the block ID set initialized by the DDL transaction, and determine whether there is an added (unprocessed due to block splitting) block. If there is an added block, indicating that splitting has occurred during the execution process, the process proceeds to step 16. If there is no added block, indicating that all the blocks are processed, the process proceeds to step 17.

Step 16: determine whether parallel execution is required. If yes, that is, the added blocks still need to be executed in parallel (for example, a lot of newly generated blocks are still selected to be executed in parallel), the process returns to step 5, a parallel degree is selected for a set composed of the added blocks, a parallel task is initialized, and a parallel execution flow is started. If no, that is, the added blocks do not need to be executed in parallel, and the process returns to step 6 to perform serial processing on the added blocks. This serial execution mode does not need to determine whether a block is added in the process after being ended.

Step 17: modify an index state to public (indicating that the index is created and can be normally used).

Step 18: mark the end of the DDL task.

Through the foregoing two embodiments, it can be seen that for scanning data in parallel, a block set detection and processing process is added. That is, it is compared whether added blocks are found in the first block set and the second block set, so as to avoid new blocks generated by splitting being missed. Serial execution does not cause scan missing. Since serial execution does not require acquisition of block sets in advance, all blocks are scanned in sequence, and therefore no data that is not scanned in a newly split block in the process will be missed.

The parallel execution flow provided by the foregoing two embodiments can greatly improve the scanning speed of a big data table, and the overall performance of a database system can be greatly improved relative to an added detection process.

The foregoing various embodiments introduce the technical solution of resuming the execution from a data processing interruption point of a DDL transaction under various application scenarios in detail. As to each DDL transaction required to scan a full table to complete data processing, the DDL transaction can be completed only by scanning the full table data once theoretically, thereby greatly improving the success rate of the DDL transaction. In addition, since the execution can be continued from the interruption, cluster computing and storage resources occupied during the DDL execution are greatly saved, whereby the resources used by the previous computation are not wasted because of the interruption of the DDL transaction and the roll-back of final statements. In other words, the waste of resource reuse due to the failure of the DDL transaction is greatly reduced, whereby the resource utilization rate of the distributed database is higher.

Further, since the data progress of the DDL transaction can be conveniently returned, users can clearly know the current situation of DDL execution, thereby improving the human-computer interaction efficiency. In addition, since the DDL transaction is processed in blocks, it is easy to realize parallel scanning to process data, thereby greatly improving the speed of DDL execution. By properly processing data in parallel, DDL statements can be quickly completed indeed.

Figure 13:
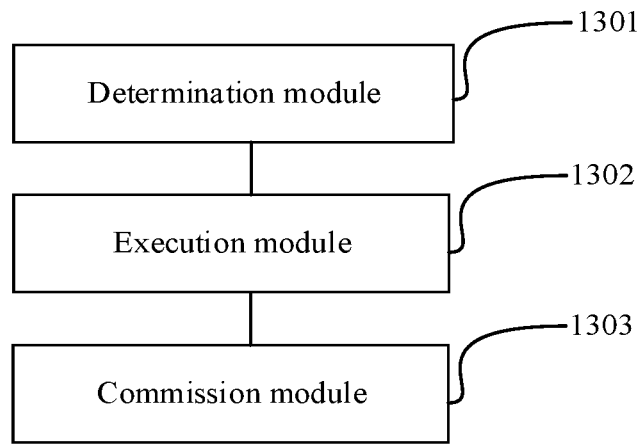
FIG. 13 is a schematic structural diagram of a transaction execution apparatus according to an embodiment of the present disclosure.

FIG. 13 is a schematic structural diagram of a transaction execution apparatus according to an embodiment of the present disclosure. As shown in FIG. 13, the apparatus includes:

- a determination module 1301, configured to determine, when a DDL transaction in execution interruption satisfies a resumption condition, a last data block processed by the DDL transaction before the execution interruption;
- an execution module 1302, configured to continue, starting from a next data block following the last data block, executing the DDL transaction; and
- a commission module 1303, configured to commit the DDL transaction when each data block operated by the DDL transaction is processed.

In the technical solution provided by this embodiment of the present disclosure, data blocks are taken as minimum units for processing a DDL transaction. In the execution interruption of the DDL transaction, a last data block processed before the interruption can be conveniently located. It is not required to roll back the DDL transaction as a whole, but to continue, starting from a next data block, executing the DDL transaction, thereby avoiding the redundant workload caused by redoing the DDL transaction, improving the success rate of the DDL transaction indicated by a DDL statement, and improving the resource utilization rate of a database.

In some embodiments, based on the apparatus components in FIG. 13, the determination module 1301 includes: an obtaining unit, configured to obtain management data of the DDL transaction, the management data recording each data block processed by the DDL transaction; and a query unit, configured to query the last data block from the management data.

In some embodiments, the management data is a dynamic array. A data block ID of each data block processed by the DDL transaction is stored in the dynamic array. The query unit is configured to: determine a data block indicated by a data block ID stored within a last element in the dynamic array as the last data block.

In some embodiments, when respective data records stored in each data block are processed, the data block ID of the data block is recorded in the management data.

In some embodiments, based on the apparatus components in FIG. 13, the apparatus further includes: a first obtaining module, configured to obtain, in response to a progress query instruction for the DDL transaction, a data progress of the DDL transaction based on the management data and a total number of data blocks required to be processed by the DDL transaction; and a transmitting unit, configured to return the data progress of the DDL transaction to a device triggering the progress query instruction.

In some embodiments, the first obtaining module is configured to: determine a value obtained by dividing the number of data blocks recorded in the management data by the total number of data blocks as the data progress of the DDL transaction.

In some embodiments, the execution module 1302 is configured to: read the next data block or any data block following the next data block, and process each data record stored in the data block.

In some embodiments, the execution module 1302 is configured to: perform, starting from the next data block following the last data block, parallel processing on each data block that is not processed by the DDL transaction based on a parallel degree of the DDL transaction.

In some embodiments, based on the apparatus components in FIG. 13, the apparatus further includes: a second obtaining module, configured to obtain a first data block set and a second data block set of the DDL transaction when the parallel processing is completed, the first data block set recording each data block in a data table required to be operated by the DDL transaction at the start of execution, and the second data block set recording each data block in the data table required to be operated by the DDL transaction upon completion of the parallel processing. The commission module 1303 is further configured to commit the DDL transaction when the first data block set and the second data block set are consistent with each other. The execution module 1302 is further configured to determine added data blocks in the second data block set compared with the first data block set when the first data block set and the second data block set are inconsistent with each other. The commission module 1303 is further configured to commit the DDL transaction upon processing of the added data blocks.

In some embodiments, when the DDL transaction is an online DDL transaction, the resumption condition includes: a data dictionary of a data table operated by the DDL transaction includes a definition of an object operated by the DDL transaction, and a data block operated by the DDL transaction or at least one copy of the data block is readable.

In some embodiments, when the DDL transaction is an offline DDL transaction, the resumption condition includes: both an original data table operated by the DDL transaction and a temporary data table created by the DDL transaction exist.

All the foregoing example technical solutions may be combined in different manners to form other embodiments of the present disclosure, and will not be described in detail herein.

The transaction execution apparatus provided in the foregoing embodiments is illustrated with an example of division of the foregoing function modules during the execution of a DDL transaction. In practical application, the foregoing functions may be allocated to and completed by different function modules according to requirements. That is, an internal structure of a computing device is divided into different function modules, so as to complete all or part of the functions described above. In addition, the transaction execution apparatus provided in the foregoing embodiments and the transaction execution method embodiments fall within the same conception. A specific implementation process is described in detail with reference to the transaction execution method embodiments and will not be described in detail herein.

Figure 14:
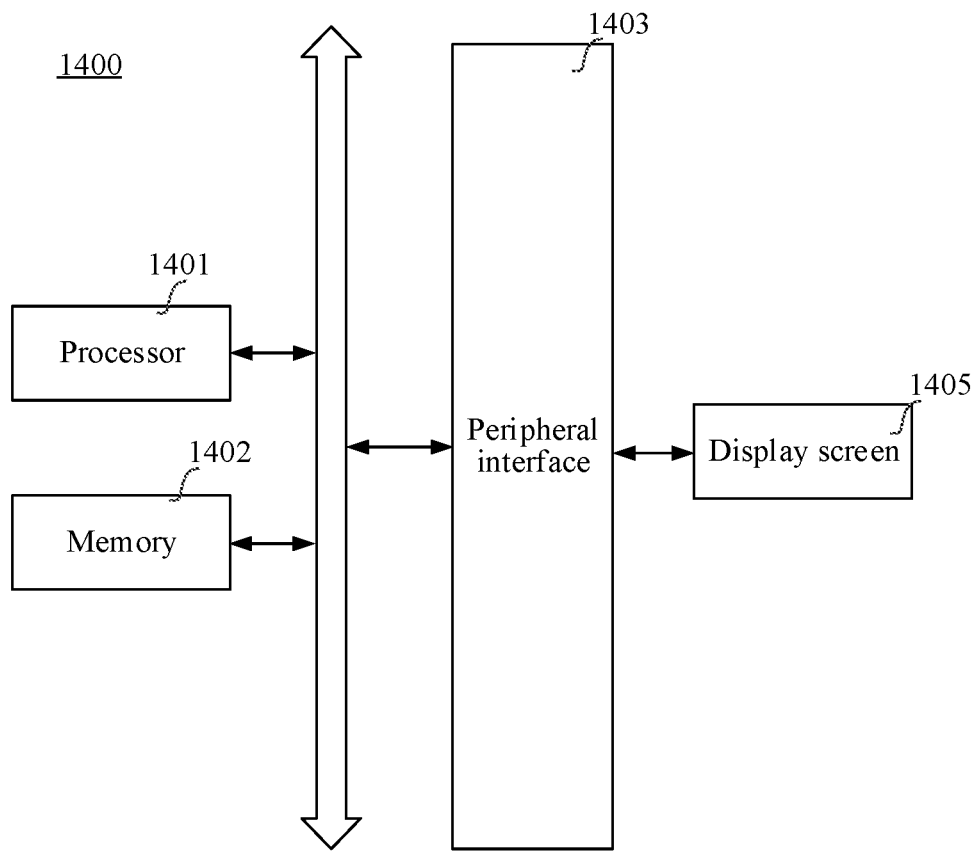
FIG. 14 is a schematic structural diagram of a terminal according to an embodiment of the present disclosure.

FIG. 14 is a structural diagram of a terminal according to an embodiment of the present disclosure. A terminal 1400 is an exemplary illustration of a computing device. In some embodiments, device types of the terminal 1400 include: smartphones, tablet personal computers, laptop computers, or desktop computers. The terminal 1400 may also be referred to as another name such as user equipment, a portable terminal, a laptop terminal, or a desktop terminal.

Generally, the terminal 1400 includes: a processor 1401 and a memory 1402.

In some embodiments, the processor 1401 includes one or more processing cores, such as a 4-core processor or an 8-core processor. In some embodiments, the processor 1401 is implemented by at least one hardware form in a digital signal processing (DSP), a field-programmable gate array (FPGA), and a programmable logic array (PLA). In some embodiments, the processor 1401 includes a main processor and a co-processor. The main processor is a processor for processing data in a wake-up state, and is also referred to as a central processing unit (CPU). The co-processor is a low-power processor for processing data in a standby state. In some embodiments, the processor 1401 is comprehensive with a graphics processing unit (GPU). The GPU is responsible for rendering and drawing content to be displayed by a display screen.

In some embodiments, the memory 1402 includes one or more computer-readable storage media. In some embodiments, the computer-readable storage medium is non-transitory. In some embodiments, the memory 1402 further includes a high-speed random access memory and a non-volatile memory, such as one or more disk storage devices or flash storage devices. In some embodiments, the non-transitory computer-readable storage medium in the memory 1402 is configured to store at least one program code. The at least one program code can be execution by the processor 1401 to implement the transaction execution method according to the various embodiments of the present disclosure.

In some embodiments, the terminal 1400 further includes: a peripheral interface 1403 and at least one peripheral. The processor 1401, the memory 1402, and the peripheral interface 1403 may be connected through a bus or a signal cable. Each peripheral may be connected to the peripheral interface 1403 through a bus, a signal cable, or a circuit board. The peripheral includes: a display screen 1405.

The peripheral interface 1403 may be configured to connect the at least one peripheral related to input/output (I/O) to the processor 1401 and the memory 1402. In some embodiments, the processor 1401, the memory 1402, and the peripheral interface 1403 are integrated on the same chip or circuit board. In some other embodiments, any one or two of the processor 1401, the memory 1402, and the peripheral interface 1403 are implemented on a separate chip or circuit board.

The display screen 1405 is configured to display a user interface (UI). In some embodiments, the UI includes a graph, text, an icon, a video, and any combination thereof. When the display screen 1405 is a touch display screen, the display screen 1405 also has the ability to acquire a touch signal at or above the surface of the display screen 1405. The touch signal may be inputted to the processor 1401 as a control signal for processing. In some embodiments, the display screen 1405 is further configured to provide virtual buttons and/or virtual keyboards, also referred to as soft buttons and/or soft keyboards. In some embodiments, the display screen 1405 may be made of materials such as a liquid crystal display (LCD) and an organic light-emitting diode (OLED).

It may be appreciated by a person skilled in the art that the structure shown in FIG. 14 is not limiting of the terminal 1400 and may include more or fewer assemblies than illustrated, or some assemblies may be combined, or different assembly arrangements may be employed.

Figure 15:
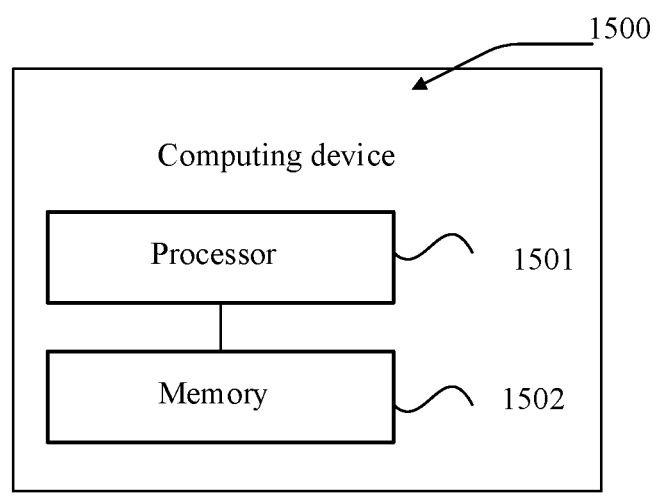
FIG. 15 is a schematic structural diagram of a computing device according to an embodiment of the present disclosure.

FIG. 15 is a schematic structural diagram of a computing device according to an embodiment of the present disclosure. The computing device 1500 may vary largely due to different configurations or performance. The computing device 1500 includes one or more central processing units (CPUs) 1501 and one or more memories 1502. The one or more memories 1502 store at least one computer program. The at least one computer program is loaded and executed by the one or more CPUs 1501 to implement the transaction execution method provided in the foregoing embodiments. In some embodiments, the computing device 1500 also has components such as a wired or wireless network interface, a keyboard, and an I/O interface for I/O. The computing device 1500 also includes other components for realizing the functions of the device, which will not be described in detail herein.

In an exemplary embodiment, a computer-readable storage medium, for example, a memory including at least one computer program is also provided. The at least one computer program may be executed by a processor in a terminal to complete the transaction execution method in the foregoing embodiments. For example, the computer-readable storage medium includes a read-only memory (ROM), a random-access memory (RAM), a compact disc read-only memory (CD-ROM), a magnetic tape, a floppy disk, an optical data storage device, and the like.

In an exemplary embodiment, a computer program product or a computer program is also provided, including one or more program codes. The one or more program codes are stored in a computer-readable storage medium. One or more processors of a computing device may read the one or more program codes from the computer-readable storage medium. The one or more processors execute the one or more program codes, whereby the computing device completes the transaction execution method in the foregoing embodiments.

The term module (and other similar terms such as sub-module, unit, subunit, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or any other integrated circuit) capable of executing computer instructions or computer code. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

A person of ordinary skill in the art may appreciate that all or part of the steps for implementing the foregoing embodiments may be completed by hardware as well as by programming associated hardware. The program is stored in a computer-readable storage medium. In some embodiments, the above-mentioned storage medium is a ROM, a magnetic or optical disk, or the like.

The foregoing descriptions are merely example embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A transaction execution method, performed by a computing device, the method comprising:
   determining, in response to a data definition language (DDL) transaction in execution interruption being an online DDL transaction and in response to that a data dictionary of a data table operated by the DDL transaction does not include a definition of an object operated by the DDL transaction or that a next data block and copies of the next data block are unavailable, rolling back the DDL transaction, wherein the next data block is a block that follows a last data block processed by the DDL transaction before the execution interruption;
   in response to the DDL transaction being the online DDL transaction and in response to that the data dictionary of the data table comprises the definition of the object, and that a data block operated by the DDL transaction or at least one copy of the data block is readable:
     determining the last data block processed by the DDL transaction before the execution interruption;
     continuing, starting from the next data block following the last data block, executing the DDL transaction; and
   committing the DDL transaction after data blocks starting from the next data block operated by the DDL transaction are processed.

2. The method according to claim 1, wherein determining the last data block processed by the DDL transaction before the execution interruption comprises:
   obtaining management data of the DDL transaction, wherein the management data records the data blocks processed by the DDL transaction; and
   querying and obtaining the last data block from the management data.

3. The method according to claim 2, wherein the management data is a dynamic array, and a data block identification (ID) of a data block processed by the DDL transaction is stored in the dynamic array; and
   querying the last data block from the management data comprises:
     determining a data block indicated by a data block ID stored within a last element in the dynamic array as the last data block.

4. The method according to claim 2, wherein in response to data records stored in the data blocks being processed, the data block IDs of the data blocks are recorded in the management data.

5. The method according to claim 3, wherein in response to data records stored in the data blocks being processed, the data block IDs of the data blocks are recorded in the management data.

6. The method according to claim 2, further comprising:
   obtaining, in response to a progress query instruction for the DDL transaction, a data progress of the DDL transaction based on the management data and a total number of data blocks required to be processed by the DDL transaction; and
   returning the data progress of the DDL transaction to a device triggering the progress query instruction.

7. The method according to claim 3, further comprising:
   obtaining, in response to a progress query instruction for the DDL transaction, a data progress of the DDL transaction based on the management data and a total number of data blocks required to be processed by the DDL transaction; and
   returning the data progress of the DDL transaction to a device triggering the progress query instruction.

8. The method according to claim 6, wherein obtaining the data progress of the DDL transaction based on the management data and the total number of data blocks required to be processed by the DDL transaction comprises:
   determining a value obtained by dividing the number of data blocks recorded in the management data by the total number of data blocks as the data progress of the DDL transaction.

9. The method according to claim 7, wherein obtaining the data progress of the DDL transaction based on the management data and the total number of data blocks required to be processed by the DDL transaction comprises:
   determining a value obtained by dividing the number of data blocks recorded in the management data by the total number of data blocks as the data progress of the DDL transaction.

10. The method according to claim 1, wherein continuing, starting from the next data block following the last data block, executing the DDL transaction comprises:
    reading the next data block or a data block following the next data block, and processing a data record stored in the data block.

11. The method according to claim 1, wherein continuing, starting from the next data block following the last data block, executing the DDL transaction comprises:
    performing, starting from the next data block following the last data block, parallel processing on a data block that is not processed by the DDL transaction based on a parallel degree of the DDL transaction.

12. The method according to claim 10, wherein continuing, starting from the next data block following the last data block, executing the DDL transaction comprises:
    performing, starting from the next data block following the last data block, parallel processing on a data block that is not processed by the DDL transaction based on a parallel degree of the DDL transaction.

13. The method according to claim 11, further comprising:
    obtaining a first data block set and a second data block set of the DDL transaction after the parallel processing is completed, the first data block set recording a data block in a data table required to be operated by the DDL transaction at a start of execution, and the second data block set recording a data block in the data table required to be operated by the DDL transaction upon completion of the parallel processing;

committing the DDL transaction in response to the first data block set being consistent with the second data block set; and determining newly added data blocks in the second data block set compared with the first data block set in response to the first data block set being inconsistent with the second data block set, and committing the DDL transaction upon processing of the newly added data blocks.

14. The method according to claim 12, further comprising:

obtaining a first data block set and a second data block set of the DDL transaction after the parallel processing is completed, the first data block set recording a data block in a data table required to be operated by the DDL transaction at a start of execution, and the second data block set recording a data block in the data table required to be operated by the DDL transaction upon completion of the parallel processing;

committing the DDL transaction in response to the first data block set being consistent with the second data block set; and determining newly added data blocks in the second data block set compared with the first data block set in response to the first data block set being inconsistent with the second data block set, and committing the DDL transaction upon processing of the newly added data blocks.

15. The method according to claim 1, wherein the method further comprises:

in response to the DDL transaction being an offline transaction and in response to that both an original data table operated by the DDL transaction and a temporary data table created by the DDL transaction exist:

determining the last data block processed by the DDL transaction before the execution interruption;

continuing, starting from the next data block following the last data block, executing the DDL transaction; and committing the DDL transaction after data blocks starting from the next data block.

16. The claim according to claim 15, further comprising: in response to the DDL transaction being the offline transaction and in response to that the original data table exists and that the temporary data table is not created, rolling back the DDL transaction.

17. A computing device, comprising one or more processors and one or more memories, the one or more memories storing at least one computer program, the at least one computer program being loaded and executed by the one or more processors to implement a transaction execution method comprising:

determining, in response to a data definition language (DDL) transaction in execution interruption being an online DDL transaction and in response to that a data dictionary of a data table operated by the DDL transaction does not include a definition of an object operated by the DDL transaction or that a next data block and copies of the next data block are unavailable, rolling back the DDL transaction, wherein the next data block is a block that follows a last data block processed by the DDL transaction before the execution interruption;

in response to the DDL transaction being the online DDL transaction and in response to that the data dictionary of the data table comprises the definition of the object, and that a data block operated by the DDL transaction or at least one copy of the data block is readable:

determining the last data block processed by the DDL transaction before the execution interruption;

continuing, starting from the next data block following the last data block, executing the DDL transaction; and committing the DDL transaction after data blocks starting from the next data block operated by the DDL transaction are processed.

18. The device according to claim 17, wherein determining the last data block processed by the DDL transaction before the execution interruption comprises:

obtaining management data of the DDL transaction, wherein the management data records the data blocks processed by the DDL transaction; and querying and obtaining the last data block from the management data.

19. The device according to claim 18, wherein the management data is a dynamic array, and a data block identification (ID) of a data block processed by the DDL transaction is stored in the dynamic array; and querying the last data block from the management data comprises:

determining a data block indicated by a data block ID stored within a last element in the dynamic array as the last data block.

20. A non-transitory computer readable storage medium, storing at least one computer program, the at least one computer program being loaded and executed by a processor to implement a transaction execution method comprising:

determining, in response to a data definition language (DDL) transaction in execution interruption being an online DDL transaction and in response to that a data dictionary of a data table operated by the DDL transaction does not include a definition of an object operated by the DDL transaction or that a next data block and copies of the next data block are unavailable, rolling back the DDL transaction, wherein the next data block is a block that follows a last data block processed by the DDL transaction before the execution interruption;

in response to the DDL transaction being the online DDL transaction and in response to that the data dictionary of the data table comprises the definition of the object, and that a data block operated by the DDL transaction or at least one copy of the data block is readable:

determining the last data block processed by the DDL transaction before the execution interruption;

continuing, starting from the next data block following the last data block, executing the DDL transaction; and committing the DDL transaction after data blocks starting from the next data block operated by the DDL transaction are processed.

* * * * *